US008742691B2

(12) United States Patent
Imanaka

(10) Patent No.: US 8,742,691 B2
(45) Date of Patent: Jun. 3, 2014

(54) LOAD DRIVING CIRCUIT

(75) Inventor: Yoshinori Imanaka, Kyoto (JP)

(73) Assignee: Rohm Co., Ltd. (JP)

( * ) Notice: Subject to any disclaimer, the term of this patent is extended or adjusted under 35 U.S.C. 154(b) by 515 days.

(21) Appl. No.: 13/169,112

(22) Filed: Jun. 27, 2011

(65) Prior Publication Data

US 2011/0316449 A1 Dec. 29, 2011

(30) Foreign Application Priority Data

Jun. 28, 2010 (JP) ................................ 2010-146490
Jun. 28, 2010 (JP) ................................ 2010-146491
Sep. 30, 2010 (JP) ................................ 2010-222521

(51) Int. Cl.
*H05B 37/02* (2006.01)
*H02M 1/00* (2007.01)

(52) U.S. Cl.
USPC ........ 315/307; 315/209 R; 315/219; 315/291; 363/21.04; 363/21.1; 363/26; 363/123

(58) Field of Classification Search
USPC ............. 315/177, 209 R, 219, 291, 294, 307, 315/308; 363/21.02, 21.04, 21.09, 21.1, 363/21.11, 26, 123
See application file for complete search history.

(56) References Cited

U.S. PATENT DOCUMENTS 8,213,189 B2 * 7/2012 Nishikawa ................. 363/21.02
8,437,152 B2 * 5/2013 Sato et al. .................. 363/21.02
8,593,835 B2 * 11/2013 Eom et al. ....................... 363/24

FOREIGN PATENT DOCUMENTS

JP 2003-153529 A 5/2003
JP 2004-47538 A 2/2004

* cited by examiner

*Primary Examiner* — Douglas W Owens
*Assistant Examiner* — Thai Pham
(74) *Attorney, Agent, or Firm* — Cantor Colburn LLP

(57) ABSTRACT

A main transformer is arranged such that a load is connected to its secondary winding side. A first error amplifier generates a feedback signal that corresponds to the difference between a detection signal which indicates the electrical state of the load and a predetermined first reference voltage. A current generating resistor is arranged between a current generating transistor and a fixed voltage terminal. A second error amplifier is arranged such that the first input terminal receives the electric potential at a node that connects the current generating transistor and the current generating resistor, a predetermined second reference voltage is input to the second input terminal thereof, and the output terminal thereof is connected to the control terminal of the current generating transistor. An adjustment resistor is arranged between the output terminal of the first error amplifier and a node that connects the current generating transistor and the current generating resistor.

26 Claims, 13 Drawing Sheets

4a

100b

LOAD DRIVING CIRCUIT

CROSS REFERENCE TO RELATED APPLICATIONS

This application is based on Japanese Application Nos. 2010-146490, filed Jun. 28, 2010; 2010-146491, filed Jun. 28, 2010 and 2010-2225210, filed Sep. 30, 2010, the entire contact of which is hereby incorporated by reference.

BACKGROUND OF THE INVENTION

1. Field of the Invention

The present invention relates to a load driving circuit configured to convert a DC current into an AC voltage, or to convert a DC voltage into a DC voltage, so as to drive a load.

2. Description of the Related Art

In recent years, liquid crystal TVs, which provide a display having a thin shape and a large size, have been becoming popular as replacements for CRT-based TVs. Liquid crystal displays include multiple cold cathode fluorescent lamps (which will be referred to as "CCFLs" hereafter) or external electrode fluorescent lamps (which will be referred to as "EEFLs" hereafter) arranged on the back face of a liquid crystal panel on which video images are to be displayed, which are used as light-emitting backlights.

For example, a driving circuit for a fluorescent lamp includes an inverter configured to convert a DC input voltage obtained by smoothing a commercial AC voltage into an AC driving signal. The inverter is configured to adjust the driving signal such that the electrical state of the load, e.g., the current that flows through the load approaches a target value that corresponds to the desired luminance level.

RELATED ART DOCUMENTS

Patent Documents

[Patent document 1]
Japanese Patent Application Laid Open No. 2003-153529
[Patent document 2]
Japanese Patent Application Laid Open No. 2004-47538

(1) As a method for adjusting the electrical state of the load, known methods include the pulse width modulation (PWM) method and the pulse frequency modulation (PFM) method. With the PFM control, the frequency of a signal to be supplied to the load is dynamically changed. However, from the set design point of view, such an arrangement is preferably configured to be capable of freely setting the frequency variation range.

(2) Furthermore, in a case in which the load is configured as a light emitting element, as a method for adjusting the luminance level of such a light emitting element, a burst dimming control method is known, in which the on period and the off period are alternately repeated, and the duty ratio thereof is changed.

SUMMARY OF THE INVENTION

An embodiment of the present invention has been made in view of such a situation. Accordingly, it is an exemplary purpose of the present invention to provide a load driving circuit which is capable of adjusting the frequency variation range.

1. An embodiment of the present invention relates to a load driving circuit configured to convert an input voltage into a driving signal, and to supply the driving signal thus converted to a load. The load driving circuit comprises: a main transformer arranged such that the load is connected to a secondary winding side thereof; a first error amplifier configured to generate a feedback signal that corresponds to the difference between a detection signal which indicates an electrical state of the load and a predetermined first reference voltage; a current generating transistor; a current generating resistor arranged between the current generating transistor and a fixed voltage terminal; a second error amplifier arranged such that a first input terminal thereof receives, as an input signal, an electric potential at a connection node that connects the current generating transistor and the current generating resistor, a predetermined second reference voltage is input to a second input terminal thereof, and an output terminal thereof is connected to a control terminal of the current generating transistor; an adjustment resistor arranged between an output terminal of the first error amplifier and a connection node that connects the current generating transistor and the current generating resistor; an oscillator configured to alternately repeat a state in which a capacitor is charged using a charging current that corresponds to a frequency control current that flows through the current generating transistor and a state in which the capacitor is discharged, so as to output a pulse frequency modulation signal having an edge synchronized to the charge/discharge transition; and a main transformer driving unit configured to drive a primary winding of the main transformer according to the pulse frequency modulation signal.

With the second reference voltage as $V_{RT}$, and with the resistance value of the current generating resistor as $R_{RT}$, the current $I_{RT}$ that flows through the current generating resistor is represented by $I_{RT}=V_{RT}/R_{RT}$. Furthermore, with the voltage level of the feedback signal as $V_{FB}$, and with the resistance value of the adjustment resistor as $R_{ADJ}$, the current $I_{ADJ}$ that flows through the adjustment resistor is represented by $I_{ADJ}=(V_{RT}-V_{FB})/R_{ADJ}$. The frequency control current $I_{CT}$ that flows through the current generating transistor is the sum of the two currents $I_{RT}$ and $I_{ADJ}$.

$$I_{CT}=I_{RT}+I_{ADJ}.$$

The pulse width of the frequency modulation signal generated by the oscillator, i.e., the frequency of the pulse frequency modulation signal, changes according to the frequency control current $I_{CT}$.

With such an embodiment, the current $I_{ADJ}$ is adjusted by means of feedback control such that the detection signal matches the first reference voltage. Thus, such an arrangement is capable of controlling the frequency of the pulse frequency modulation signal such that the electrical state of the load approaches the target value.

Furthermore, such an arrangement is capable of adjusting the range in which the frequency is changed, according to the resistance values of the adjustment resistor and the current generating resistor.

Also, the oscillator may comprise: a capacitor arranged such that one terminal thereof is set to a fixed electric potential; a charging circuit configured to supply, to the capacitor, a charging current that is proportional to the frequency control current that flows through the current generating transistor; a discharging transistor arranged between the capacitor and a fixed voltage terminal; a peak detection comparator configured to assert a set signal when a voltage that develops at the other terminal of the capacitor reaches a predetermined threshold voltage; a maximum duty ratio setting circuit configured to assert a reset signal after a predetermined delay time elapses after the set signal is asserted; and a flip-flop configured to generate an output signal having a level that transits every time the set signal or the reset signal is asserted, and to output the output signal thus generated to a control terminal of the discharging transistor.

With such an embodiment, the low level period of the frequency modulation signal can be set by setting the delay time, which can be used as dead time.

Also, the maximum duty ratio setting circuit may be configured to adjust the delay time such that it is inversely proportional to the frequency control current. Such an arrangement is capable of maintaining the duty ratio of the pulse frequency modulation signal at a constant value regardless of the frequency thereof.

Also, the maximum duty ratio setting circuit may be configured to set a lower limit value for the delay time. Thus, such an arrangement is capable of preventing the dead time from vanishing even if the frequency of the pulse frequency modulation signal is raised. Thus, such an arrangement provides improved reliability of the circuit.

Also, the main transformer driving unit may comprise: a half-bridge circuit connected to a primary winding of the main transformer; a high-side driver configured to drive a high-side transistor of the half-bridge circuit; a low-side driver configured to drive a low-side transistor of the half-bridge circuit; a pulse transformer arranged such that a secondary winding thereof is connected to the high-side driver and the low-side driver; and a pulse transformer driving unit configured to apply a driving pulse to a primary winding of the pulse transformer according to the pulse frequency modulation signal.

With such an embodiment, by raising the duty ratio of the pulse frequency modulation signal, such an arrangement is capable of reducing dead time during which the high-side transistor and the low-side transistor are turned off at the same time. By providing such reduced dead time, such an arrangement is capable of reducing power loss that occurs at the high-side transistor and the low-side transistor.

Also, the secondary winding of the pulse transformer, the high-side driver, the low-side driver, the half-bridge circuit, and the primary winding of the main transformer may be arranged in a primary region, and the other components may be arranged in a secondary region that is electrically insulated from the primary region. With such an arrangement, the detection signal does not pass through the primary region and the secondary region. Thus, there is no need to employ a photo-coupler or the like, thereby improving the stability of the feedback control.

Also, the load may be configured as a fluorescent lamp. Also, the load driving circuit may be configured to drive the load according to a driving signal that develops at the secondary winding of the main transformer.

Also, the load may be configured as a light emitting diode. Also, the secondary winding of the main transformer may comprise a first coil and a second coil arranged such that one terminal of each coil is grounded, and such that they have opposite polarities. Also, the load driving circuit may comprise: an output capacitor arranged such that one terminal thereof is grounded; a first diode arranged between the other terminal of the first coil and the other terminal of the output capacitor; and a second diode arranged between the other terminal of the second coil and the other terminal of the output capacitor. Also, the light emitting diode may be driven according to the driving signal smoothed by the output capacitor.

Another embodiment of the present invention relates to a light emitting apparatus. The light emitting apparatus comprises: a light emitting device; and a load driving circuit according to any one of the aforementioned embodiments, configured to drive the light emitting device.

Also, the light emitting device may be configured as a fluorescent lamp. Also, the light emitting device may be configured as a light emitting diode.

Yet another embodiment of the present invention relates to a display apparatus. The display apparatus comprises: a liquid crystal panel; and the aforementioned light emitting apparatus, configured as a backlight arranged on the back face of the liquid crystal panel.

An embodiment of the present invention has been made in view of such a situation. Accordingly, it is an exemplary purpose of the present invention to provide a load driving circuit which is capable of providing the PFM control operation and the burst dimming operation.

2. Yet another embodiment of the present invention relates to a load driving circuit configured to convert an input voltage into a driving signal, and to supply the driving signal thus converted to a load. The load driving circuit comprises: a main transformer arranged such that the load is connected to a secondary winding side thereof; a first error amplifier configured to generate a feedback signal that corresponds to the difference between a detection signal which indicates an electrical state of the load and a predetermined first reference voltage; an oscillator configured to generate a pulse frequency modulation signal having a frequency that corresponds to the feedback signal; a burst current source configured to receive a pulse modulated burst dimming control signal which is an instruction to switch the period between an off period and an on period, and to perform an operation in which, when the burst dimming control signal is an instruction to set the period to the off period, a current is supplied to a terminal configured to receive the detection signal so as to change the level of the feedback signal such that the frequency of the oscillator is raised; a comparator configured to compare the feedback signal with a predetermined threshold voltage, and to generate a burst signal that corresponds to the comparison result; and a main transformer driving unit configured to drive the primary winding of the main transformer according to the pulse frequency modulation signal when the burst signal is a first level, and to stop the driving of the primary winding of the main transformer when the burst signal is a second level.

In some cases, an arrangement configured to provide only the PFM control leads to a situation in which the electric power supplied to the load cannot be set to zero. With such a load driving circuit according to the embodiment, in such a situation, the main transformer driving unit drives the main transformer intermittently according to the burst signal. Thus, such an arrangement is capable of intermittent control of the electric power to be supplied to the load.

Also, when the period transits from the off period to the on period, the main transformer driving unit may be configured to raise, over time, the duty ratio of a driving pulse to be supplied to the primary winding of the main transformer.

Also, when the period transits from the on period to the off period, the main transformer driving unit may be configured to reduce, over time, the duty ratio of the driving pulse to be supplied to the primary winding of the main transformer.

By providing the PWM control in addition to the PFM control, such an arrangement is capable of suppressing load current overshoot and/or audible noise from the transformer.

Also, the oscillator may be configured to output a cyclic signal having a ramp waveform that is synchronized to the pulse frequency modulation signal, in addition to the pulse frequency modulation signal. Also, the load driving circuit may further comprise: a slope voltage generating unit configured to generate a slope voltage having a voltage level that changes over time when level transition occurs in the burst signal; and a pulse width modulation comparator configured to compare the slope voltage with the cyclic signal so as to generate a pulse width modulation signal having a duty ratio that changes over time. Also, the main transformer driving unit may be configured to change the duty ratio of the driving pulse according to the pulse width modulation signal.

Also, the slope voltage generating unit may comprise: a capacitor arranged such that one terminal thereof is set to a fixed electric potential; and a charge/discharge circuit configured to alternately switch, when level transition occurs in the burst signal, between a state in which the capacitor is charged and a state in which the capacitor is discharged. Also, a voltage that develops at the capacitor may be output as the slope voltage.

Yet another embodiment of the present invention also relates to a load driving circuit configured to convert an input voltage into a driving signal, and to supply the driving signal thus converted to a load. The load driving circuit comprises: a main transformer arranged such that the load is connected to a secondary winding side thereof; a first error amplifier configured to generate a feedback signal that corresponds to the difference between a detection signal which indicates an electrical state of the load and a predetermined first reference voltage; an oscillator configured to generate a pulse frequency modulation signal having a frequency that corresponds to the feedback signal; a burst current source configured to receive a pulse modulated burst dimming control signal which is an instruction to switch the period between an off period and an on period, and to perform an operation in which, when the burst dimming control signal is an instruction to set the period to the off period, a current is supplied to a terminal configured to receive the detection signal so as to change the level of the feedback signal such that the frequency of the oscillator is raised; and a main transformer driving unit configured to drive a primary winding of the main transformer according to the pulse frequency modulation signal. When the period transits from the off period to the on period, the main transformer driving unit raises, over time, the duty ratio of the driving pulse to be supplied to the primary winding of the main transformer. When the period transits from the on period to the off period, the main transformer driving unit reduces the duty ratio of the driving pulse.

With such an embodiment, by applying the PFM control and the PWM control in the switching between the on period an the off period of the burst dimming, such an arrangement is capable of suppressing load current overshoot and/or audible noise from the transformer.

Also, the oscillator may be configured to output a cyclic signal having a ramp waveform that is synchronized to the pulse frequency modulation signal, in addition to the pulse frequency modulation signal. Also, the load driving circuit may further comprise: a slope voltage generating unit configured to generate a slope voltage having a voltage level that changes over time when level transition occurs in the burst dimming control signal; and a pulse width modulation comparator configured to compare the slope voltage with the cyclic signal so as to generate a pulse width modulation signal having a duty ratio that changes over time. Also, the main transformer driving unit may be configured to change the duty ratio of the driving pulse according to the pulse width modulation signal.

Such an arrangement is capable of controlling the pulse frequency modulation signal and the pulse width modulation signal such that they have matching frequencies, and such that they are mutually synchronized. Thus, such an arrangement allows the main transformer driving unit to perform signal processing in a simple manner.

Also, the slope voltage generating unit may comprise: a capacitor arranged such that one terminal thereof is set to a fixed electric potential; and a charge/discharge circuit configured to alternately switch, when level transition occurs in the burst dimming control signal, between a state in which the capacitor is charged and a state in which the capacitor is discharged. Also, a voltage that develops at the capacitor may be output as the slope voltage.

Also, the load may be configured as a fluorescent lamp. Also, the load driving circuit may be configured to drive the load according to a driving signal that develops at the secondary winding of the main transformer.

Also, the load may be configured as a light emitting diode. Also, the secondary winding of the main transformer may comprise a first coil and a second coil arranged such that one terminal of each coil is grounded, and such that they have opposite polarities. Also, the load driving circuit may comprise: an output capacitor arranged such that one terminal thereof is grounded; a first diode arranged between the other terminal of the first coil and the other terminal of the output capacitor; and a second diode arranged between the other terminal of the second coil and the other terminal of the output capacitor. Also, the light emitting diode may be driven according to the driving signal smoothed by the output capacitor.

Yet another embodiment of the present invention relates to a light emitting apparatus. The light emitting apparatus comprises: a light emitting device; and a load driving circuit according to any one of the aforementioned embodiments, configured to drive the light emitting device.

Also, the light emitting device may be configured as a fluorescent lamp. Also, the light emitting device may be configured as a light emitting diode.

Yet another embodiment of the present invention relates to a display apparatus. The display apparatus comprises: a liquid crystal panel; and the aforementioned light emitting apparatus, configured as a backlight arranged on the back face of the liquid crystal panel.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

First Embodiment

Figure 1:
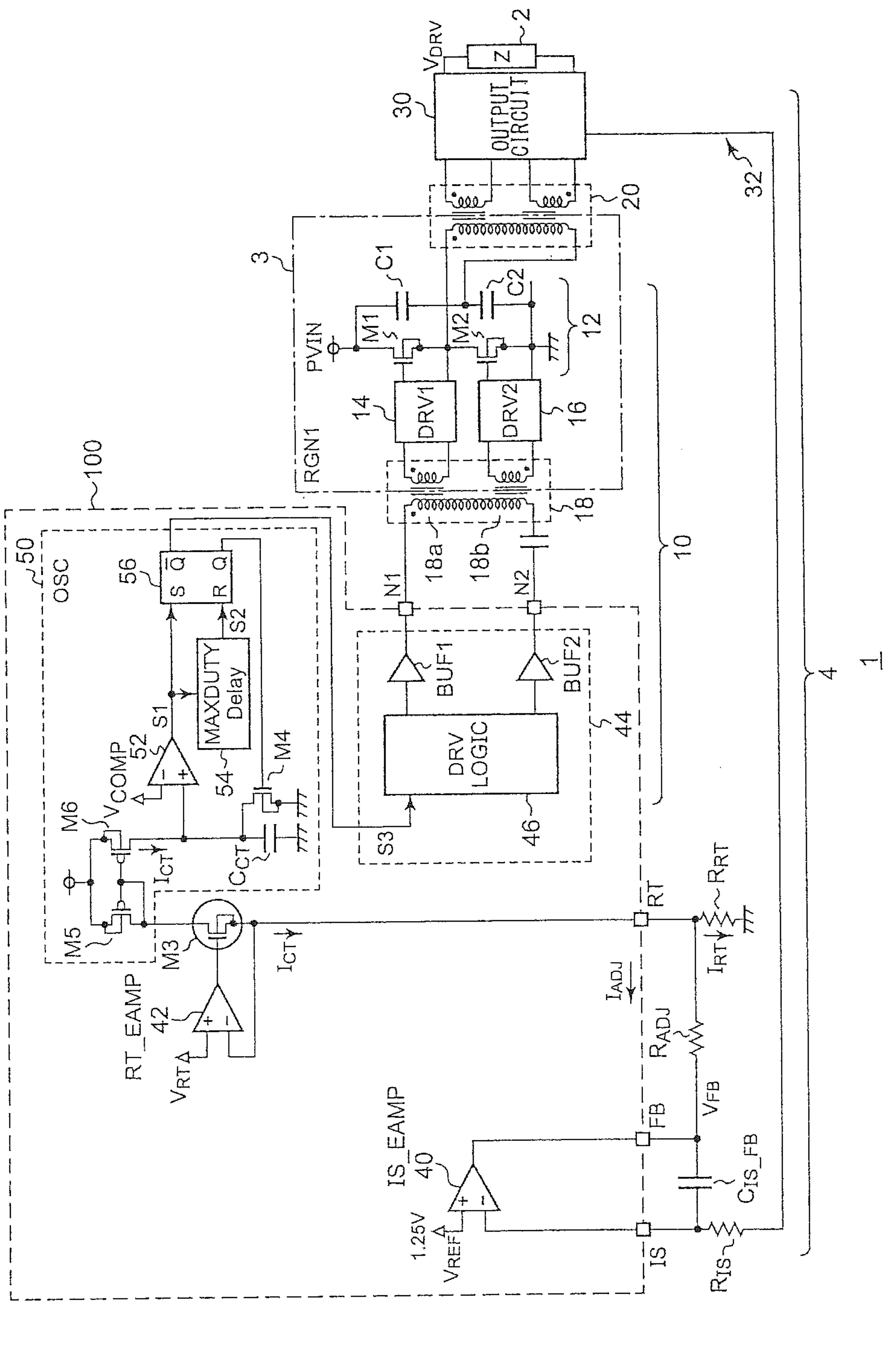
FIG. 1 is a circuit diagram which shows a configuration of an electronic device including a load driving circuit according to a first embodiment of the present invention.

FIG. 1 is a circuit diagram which shows a configuration of an electronic device 1 including a load driving circuit 4 according to a first embodiment.

Examples of a load 2 include a fluorescent lamp such as an EEFL or CCFL, and a light emitting element such as a light emitting diode (LED) or the like. However, the load 2 is not restricted in particular. In the present embodiment, the load 2 is configured as a light emitting element, and a load driving circuit 4 and the load 2 form a light emitting apparatus. Such a light emitting apparatus is used as an illumination device or a backlight of a liquid crystal panel.

The load driving circuit 4 receives an input voltage PVIN, converts the input voltage PVIN thus received into a driving voltage $V_{DRV}$ that is suitable for the load 2, and supplies the driving signal $V_{DRV}$ to the load 2. In a case in which the load 2 is a fluorescent lamp, the driving signal $V_{DRV}$ is an AC signal. In a case in which the load 2 is an LED, the driving signal $V_{DRV}$ is a DC signal.

The load driving circuit 4 mainly includes a control IC 100, a main transformer driving unit 10, a main transformer 20, an output circuit 30, and a feedback line 32.

The load 2 is directly or indirectly connected on the secondary winding side of the main transformer 20. The output circuit 30, having a topology determined according to the kind of load 2 or the driving method, is arranged as necessary between the main transformer 20 and the load 2.

The feedback line 32 is configured to feed back a detection signal that indicates the electrical state of the load 2. The electrical state indicated by the detection signal is a state that is to be adjusted by the load driving circuit 4. For example, as such an electrical state, a voltage applied to the load 2 or a current that flows through the load 2 may be employed. The detection signal may be extracted from the output circuit 30. Alternatively, the detection signal may be detected directly from the load 2. In the present specification, the detection signal that indicates the voltage is represented by VS, and the detection signal that indicates the current is represented by IS. In FIG. 1, the detection signal IS, which indicates the current, is used as a feedback signal. That is to say, the load driving circuit 4 stabilizes the level of the current that flows through the load 2 by means of feedback control according to the target luminance level of the light emitting element, which acts as the load 2.

The control IC 100 is configured as a function IC integrated on a single semiconductor substrate. As I/O terminals, the control IC 100 includes a current detection terminal IS (which will also be referred to as the "IS terminal"), a feedback terminal FB (which will also be referred to as the "FB terminal"), a current adjustment terminal RT (which will also be referred to as the "RT terminal"), and output terminals N1 and N2.

Furthermore, the control IC 100 includes a first error amplifier 40, a current generating transistor M3, a second error amplifier 42, a pulse transformer driving unit 44, and an oscillator 50.

The detection signal IS (which will also be referred to as the "IS signal" hereafter) is input to the IS terminal of the control IC 100 via a resistor $R_{IS}$.

The first error amplifier (IS_EAMP) 40 generates a feedback signal FB (which will also be referred to as the "FB signal") that corresponds to the difference between the detection signal IS, which indicates the electrical state of the load 2, and a predetermined first reference voltage $V_{REF}$. The output terminal of the first error amplifier 40 is connected to the FB terminal. A feedback capacitor $C_{IS\_FB}$ is externally connected between the FB terminal and the IS terminal. The first error amplifier 40, the resistor $R_{IS}$, and the capacitor $C_{IS\_FB}$ form a so-called integrator.

The current generating transistor M3 is configured as an N-channel MOSFET. The source of the current generating transistor M3 is connected to the RT terminal. A current generating resistor $R_{RT}$ is externally connected between the RT terminal and a fixed voltage terminal (ground terminal).

The electric potential at a connection node that connects the transistor M3 and the resistor $R_{RT}$, i.e., the electric potential at the RT terminal is input to the first input terminal (inverting input terminal −) of the second error amplifier (RT_EAMP) 42. Furthermore, a predetermined second reference voltage VRT is input to the second input terminal (non-inverting input terminal +) of the second error amplifier 42. The output terminal of the second error amplifier 42 is connected to the control terminal (gate) of the transistor M3.

An adjustment resistor $R_{ADJ}$ is externally connected between the connection node (RT terminal) that connects the transistor M3 and the resistor $R_{RT}$ and the output terminal (RB terminal) of the first error amplifier 40. A frequency control current $I_{CT}$, which is obtained by combining a current $I_{RT}$ that flows through the resistor $R_{RT}$ and a current $I_{ADJ}$ that flows through the resistor $R_{ADJ}$, flows through the transistor M3.

The current $I_{RT}$ that flows through the current generating resistor $R_{RT}$ is represented by $$I_{RT}=V_{RT}/R_{RT} \quad (1).$$

The current $I_{ADJ}$ that flows through the adjustment resistor is represented by $$I_{ADJ}=(V_{RT}-V_{FB})/R_{ADJ} \quad (2).$$

The frequency control current $I_{CT}$ that flows through the current generating transistor M3 is configured as the sum of the two currents $I_{RT}$ and $I_{ADJ}$.

$$I_{CT}=I_{RT}+I_{ADJ} \quad (3)$$

Expressions (1) and (2) are substituted into Expression (3), thereby obtaining the following Expression (4).

$$I_{CT}=V_{RT}/R_{RT}+(V_{RT}-V_{FB})/R_{ADJ} \quad (4)$$

The oscillator 50, using a charging current $I_{CT}$ that corresponds to the frequency control current $I_{CT}$ that flows through the transistor M3, alternately repeats a charging state, in which a capacitor $C_{CT}$ arranged such that one terminal thereof is set to a fixed electric potential is charged, and a discharging state, in which the capacitor $C_{CT}$ is discharged. The oscillator 50 outputs a pulse frequency modulation signal (PFM signal) S3 having an edge that is synchronized to the transition between the charging state and the discharging state. The charging current $I_{CT}$ is represented by the following Expression (5).

$$\begin{aligned} I_{CT} &= \{V_{RT}/R_{RT} + (V_{RT} - V_{FB})/R_{ADJ}\} \\ &= \{(V_{RT}/R_{RT} + V_{RT}/R_{ADJ}) - V_{FB}/R_{ADJ}\} \end{aligned} \quad (5)$$

Specifically, the oscillator 50 includes transistors M4 through M6, a capacitor $C_{CT}$, a comparator 52, a maximum duty setting unit 54, and a flip-flop 56. The transistors M5 and M6 form a current mirror circuit having a mirror ratio of 1, for example, and which is configured to duplicate and mirror the frequency control current $I_{CT}$. One terminal of the capacitor $C_{CT}$ is grounded, and accordingly, this terminal is set to a fixed electric potential. The current mirror circuit comprising the transistors M5 and M6 functions as a charging circuit, and is configured to charge the capacitor $C_{CT}$ using the charging current $I_{CT}$. The transistor M4 functions as a switch configured to discharge the capacitor $C_{CT}$, and is arranged in parallel with the capacitor $C_{CT}$.

[Charging State]

During the off period of the transistor M4, the oscillator 50 is set to the charging state, in which the capacitor $C_{CT}$ is charged using the charging current $I_{CT}$. As a result, the capacitor voltage $V_{CT}$ rises at a constant slope. The comparator 52 compares the voltage $V_{CT}$ that occurs at the capacitor $C_{CT}$ with a predetermined threshold voltage $V_{COMP}$. When the capacitor voltage $V_{CT}$ reaches the threshold voltage $V_{COMP}$, the comparator 52 asserts (sets to high level) the output signal (set signal) S1. When the signal S1 is asserted, the flip-flop 56 is set, and its output signal Q is set to high level.

[Discharging State]

When the output signal Q transits to high level, the transistor M4 is turned on, which discharges the capacitor $C_{CT}$. In this state, the capacitor voltage $V_{CT}$ drops to the vicinity of the ground voltage. After a predetermined delay time $\tau$ elapses after the output signal S1 of the comparator 52 is asserted, the maximum duty setting unit 54 asserts its output signal (reset signal) S2.

The delay time $\tau$ is preferably designed to be inversely proportional to the charging current $I_{CT}$. For example, the maximum duty setting unit 54 can be configured including a capacitor, a charging circuit, and a comparator, in the same way as the oscillator 50. With such an arrangement, the delay time $\tau$ can be set by making a combination of the capacitance, the value of the charging current, and the threshold voltage. It should be noted that the maximum duty setting unit 54 preferably sets a lower limit value for the delay time $\tau$. For example, the lower limit value is set to 200 ns.

After the capacitor $C_{CT}$ is discharged after the transistor M4 is turned on, and after the delay time $\tau$ elapses, the flip-flop 56 is reset, and the output signal Q is set to low level. As a result, the transistor M4 is turned off, and the state thus returns to the charging state.

The oscillator 50 alternately repeats the charging state and the discharging state. As a result, the capacitor $C_{CT}$ generates a ramp-shaped frequency voltage $V_{CT}$. The oscillator 50 outputs, as a PFM signal S3, a signal that corresponds to the output signal Q of the flip-flop 56, specifically, a signal obtained by inverting the output signal Q of the flip-flop 56.

The main transformer driving unit 10 drives the primary winding of the main transformer 20 according to the PFM signal S3.

The main transformer driving unit 10 includes a half-bridge circuit 12, a high-side driver 14, a low-side driver 16, a pulse transformer 18, and a pulse transformer driving unit 44.

The half-bridge circuit 12 includes a high-side transistor M1, a low-side transistor M2, a first capacitor C1, and a second capacitor C2. The high-side transistor M1 and the low-side transistor M2 are sequentially arranged in series between the input voltage PVIN and the ground voltage. Similarly, the first capacitor C1 and the second capacitor C2 are sequentially arranged in series between the input voltage PVIN and the ground voltage.

One terminal of the primary winding of the main transformer 20 is connected to a connection node that connects the transistors M1 and M2. Furthermore, the other terminal of the primary winding is connected to a connection node that connects the capacitors C1 and C2.

The high-side driver 14 is configured to drive the high-side transistor M1 of the half-bridge circuit 12. The low-side driver 16 is configured to drive the low-side transistor M2 of the half-bridge circuit 12.

The secondary winding of the pulse transformer 18 is connected to the high-side driver 14 and the low-side driver 16. The pulse transformer 18 includes a first pulse transformer 18*a* and a second pulse transformer 18*b*. When driving pulses N1 and N2 having reverse phases are applied to the primary winding of the pulse transformer 18, the high-side driver 14 and the low-side driver 16 are alternately supplied with a driving pulse. The high-side driver 14 and the low-side driver 16 alternately turn on and off the high-side transistor M1 and the low-side transistor M2 according to the driving pulses N1 and N2 thus input via the pulse transformer 18.

The primary winding of the pulse transformer 18 is connected to output terminals N1 and N2. The pulse transformer driving unit 44 applies the driving pulses N1 and N2, which correspond to the PFM signal S3, to the primary winding of the pulse transformer 18. The pulse transformer driving unit 44 includes a driving logic unit 46 and output buffer units BUF1 and BUF2. The driving logic unit 46 receives the PFM signal S3, and generates the driving pulses N1 and N2 which have the same pulse width and which have mutually reverse phases. Specifically, the pulses included in the PFM signal S3 are alternately distributed between the driving pulses N1 and N2. That is to say, the driving pulses N1 and N2 have a frequency $F_{OUT}$ that is ½ the frequency $F_{PFM}$ of the PFM signal S3. The output buffer units BUF1 and BUF2 output the driving pulses N1 and N2 via the output terminals N1 and N2, respectively.

The above is the configuration of the load driving circuit 4. Next, description will be made regarding the operation thereof.

Figure 2:
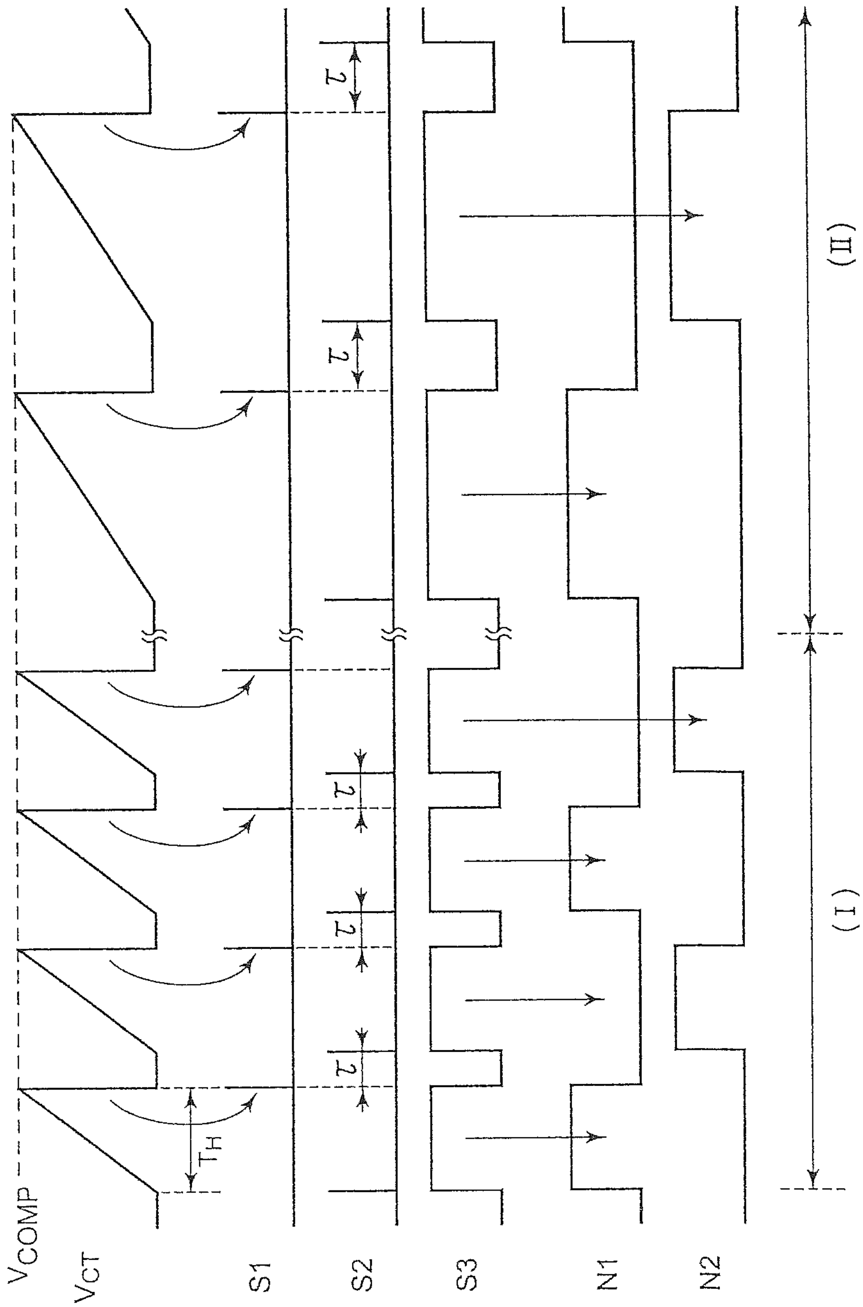
FIG. 2 is a waveform diagram which shows the operation of the load driving circuit shown in FIG. 1.

FIG. 2 is a waveform diagram which shows the operation of the load driving circuit 4 shown in FIG. 1. The vertical axis and the horizontal axis in the waveform diagrams and the time charts in the present specification are expanded or reduced as appropriate for ease of understanding. Also, each waveform shown in the drawing is simplified for ease of understanding. In the segment (I), the discharging current $I_{CT}$ has a first level. The slope of the frequency signal $V_{CT}$ is proportional to the charging current $I_{CT}$. Accordingly, the pulse width $T_H$ of the PFM signal S3 is inversely proportional to the charging current $I_{CT}$.

$$T_H = V_{COMP}/I_{CT}.$$

Furthermore, the delay time τ that corresponds to the low-level period $T_L$ of the PFM signal S3 is inversely proportional to the charging current $I_{CT}$. Accordingly, the period of the PFM signal S3, i.e., $(T_H+T_L)$, is also inversely proportional to the charging current $I_{CT}$. In other words, the frequency $F_{PFM}$ $(=1/(T_H+T_L))$ of the PFM signal S3 is proportional to the charging current $I_{CT}$.

$$F_{PFM} = K1 \times I_{CT} \tag{6}$$

When the charging current $I_{CT}$ becomes a second level that is lower than the first level in the segment (II), the frequency $F_{PFM}$ of the PFM signal S3 becomes lower in proportion to the level of the charging current $I_{CT}$.

The PFM signal S3 is alternately distributed between the driving pulses N1 and N2. During a period in which the driving pulse N1 is high level, the high-side transistor M1 is turned on. During a period in which the driving pulse N2 is high level, the low-side transistor M2 is turned on. As a result, the high-side transistor M1 and the low-side transistor M2 are alternately turned on, thereby driving the main transformer 20.

The current $I_{ADJ}$ is adjusted by means of feedback control such that the voltage level $V_{IS}$ of the detection signal IS matches the first reference voltage $V_{REF}$, and the value of the charging current $I_{CT}$ is adjusted according to the current $I_{ADJ}$. By adjusting the frequency $F_{PFM}$ of the PFM signal S3 that is proportional to the charging current $I_{CT}$, such an arrangement is capable of adjusting the energy to be supplied from the main transformer 20 to the load 2. Thus, such an arrangement is capable of controlling the electrical state of the load 2 such that it approaches the target value. That is to say, the luminance level of the load 2 can be maintained at a target value by means of PFM control.

The load driving circuit 4 configured to perform such PFM control has the following advantages as compared with other circuits configured to perform PWM control.

In a case in which the PWM control is performed for a power transistor configured to drive the main transformer 20, the on/off duty ratio of the power transistor is dynamically changed. Accordingly, a reduced on period leads to increased power loss, which is a disadvantage. In contrast, with the load driving circuit 4 shown in FIG. 1, the power transistor is turned on during the greater part of the period of the PFM signal S3, i.e., the period excluding dead time, thereby dramatically reducing the power loss.

The period in which both the driving pulses N1 and N2 are low level corresponds to the dead time in which both the high-side transistor M1 and the low-side transistor M2 are turned off. The dead time is nothing other than the delay time τ determined by the maximum duty setting unit 24. Thus, the power loss of the power transistor can be reduced as the delay time τ is reduced.

In many cases, a load driving circuit configured to perform PWM control employs a full-bridge (H-bridge) circuit. This is partly because such an arrangement requires an increased number of power transistors in order to dissipate heat generation due to the power loss. In contrast, such an arrangement configured to perform PFM control has an advantage of little power loss. Thus, a half-bridge circuit can be employed in such an arrangement, thereby providing an advantage of a reduced number of transistors.

It should be noted that, if the length of the delay period τ were excessively short, an effective dead time would vanish. With such an arrangement, in some cases, the high-side transistor M1 and the low-side transistor M2 are turned on at the same time, leading to a problem in that a through current flows. Thus, by setting a low limit value for the delay time τ, such an arrangement provides improved reliability of the circuit.

In addition to the aforementioned advantages, the load driving circuit 4 shown in FIG. 2 has the following advantage. The frequency $F_{PFM}$ of the PFM signal S3 is represented by Expression (7) from Expressions (5) and (6).

$$F_{PFM} = K1 \times \{(V_{RT}/R_{RT} + V_{RT}/R_{ADJ}) - V_{FB}/R_{ADJ}\} \tag{7}$$

Figure 3:
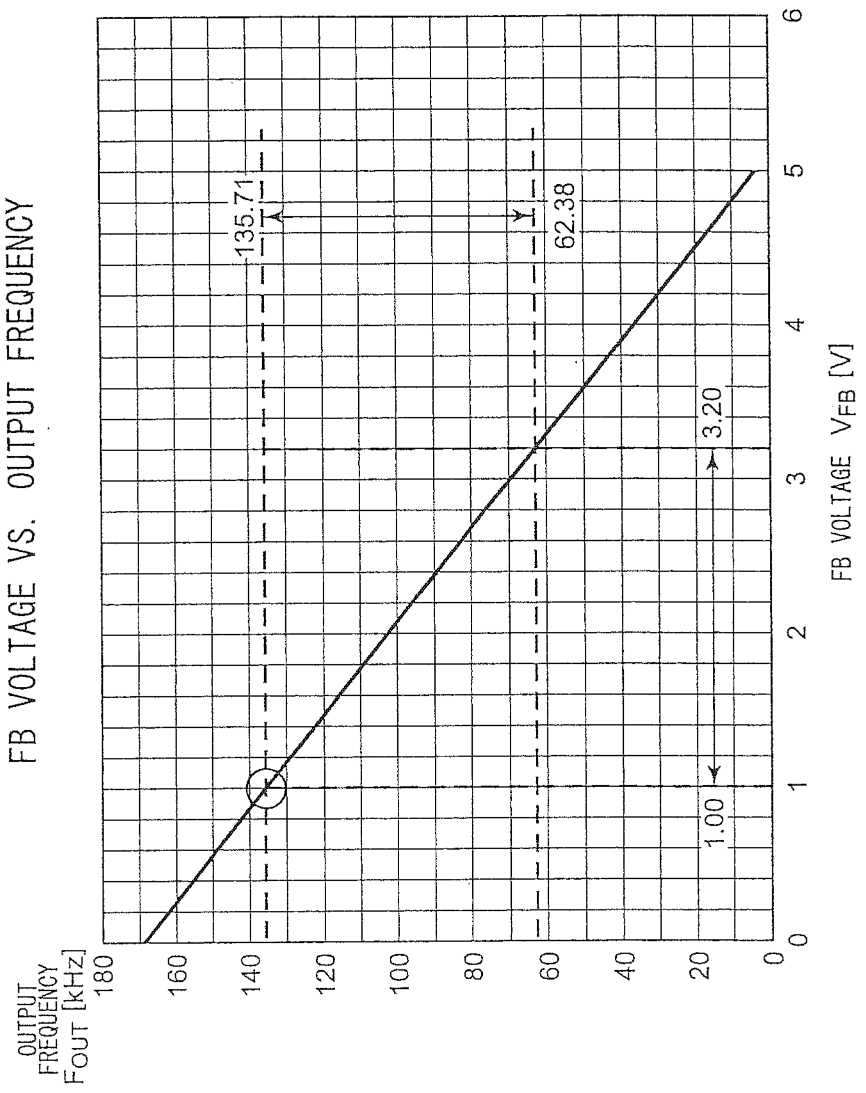
FIG. 3 is a graph showing a relation between the voltage level of an FB signal and the frequency of a PFM signal.

FIG. 3 is a graph which shows the relation between the voltage level $V_{FB}$ of the FB signal and the frequency $F_{PFM}$ of the PFM signal S3. It can be understood from Expression (7) that the slope of the linear curve changes according to the resistance of the adjustment resistor $R_{ADJ}$. Furthermore, the Y-intercept can be changed according to the resistance of the current generating resistor $R_{RT}$.

That is to say, after the voltage range of the FB signal is determined, the load driving circuit 4 shown in FIG. 1 is capable of freely determining the frequency range by means of the adjustment resistor $R_{ADJ}$ and the current generating resistor $R_{RT}$.

Figure 4:
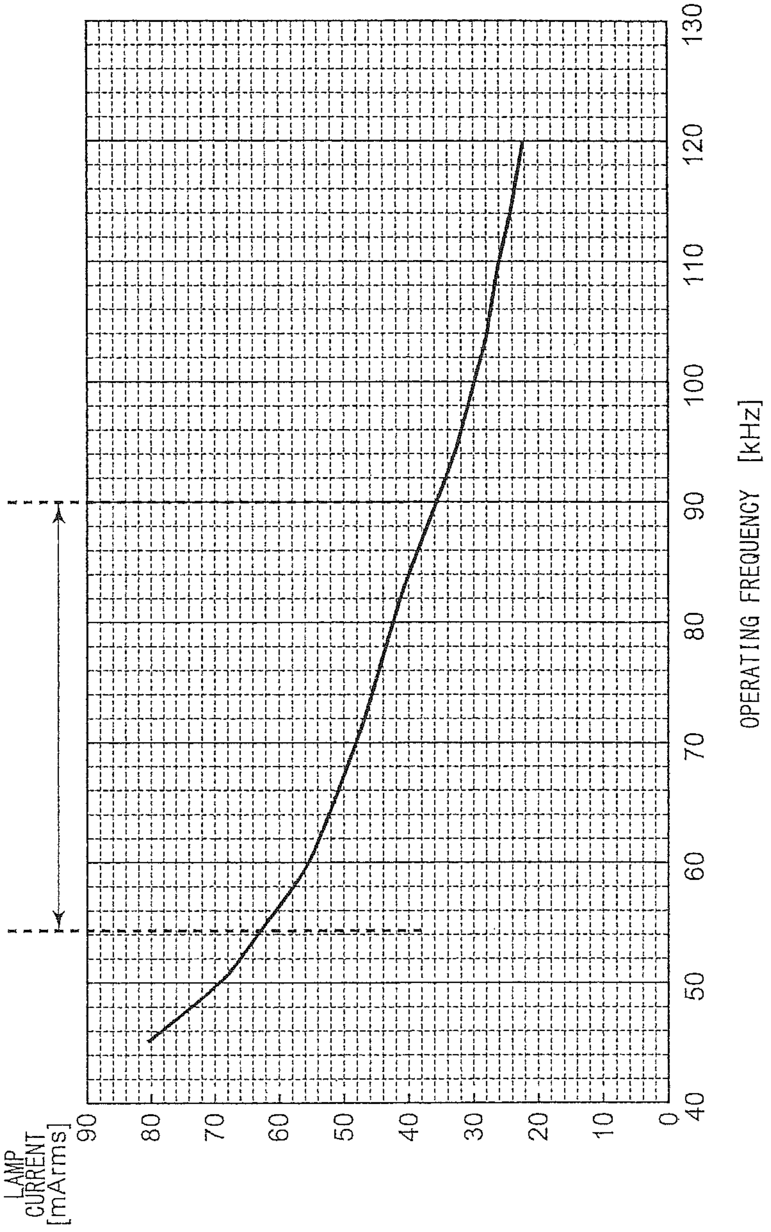
FIG. 4 is a graph showing the relation between the operating frequency and the load current (lamp current)

FIG. 4 is a graph which shows the relation between the operating frequency and the load current (lamp current) $I_{LAMP}$. The operating frequency $F_{OUT}$ is the same as that of the driving pulse N1 and that of the driving pulse N2, and is ½ the frequency $F_{PFM}$ of the PFM signal S3. As shown in FIG. 4, as the operating frequency $F_{OUT}$ becomes higher, the lamp current $I_{LAMP}$ becomes lower. It should be noted that such an arrangement is capable of adjusting the operating frequency by adjusting the resistors $R_{ADJ}$ and $R_{RT}$. Thus, it can be said that the load driving circuit 4 is capable of adjusting the range of the lamp current $I_{LAMP}$.

With the load driving circuit 4 shown in FIG. 1, the circuit components surrounded by the line of dashes and dots are arranged in the primary region, and the other circuit components are arranged in the secondary region electrically insulated from the primary region. Accordingly, the feedback line 32 configured to feed back the detection signal that indicates the state of the load 2 does not pass through the primary region and the secondary region. Thus, such an arrangement does not require a photo-coupler. Thus, such an arrangement has an advantage of improved stability of the feedback control.

Second Embodiment

As a method for adjusting the luminance level of a light emitting device, a burst dimming method is known in which the on period and the off period are alternately repeated while their duty ratio being adjusted. Description will be made in the second embodiment regarding a technique for performing such burst dimming by combining it with the aforementioned PFM control.

Figure 5:
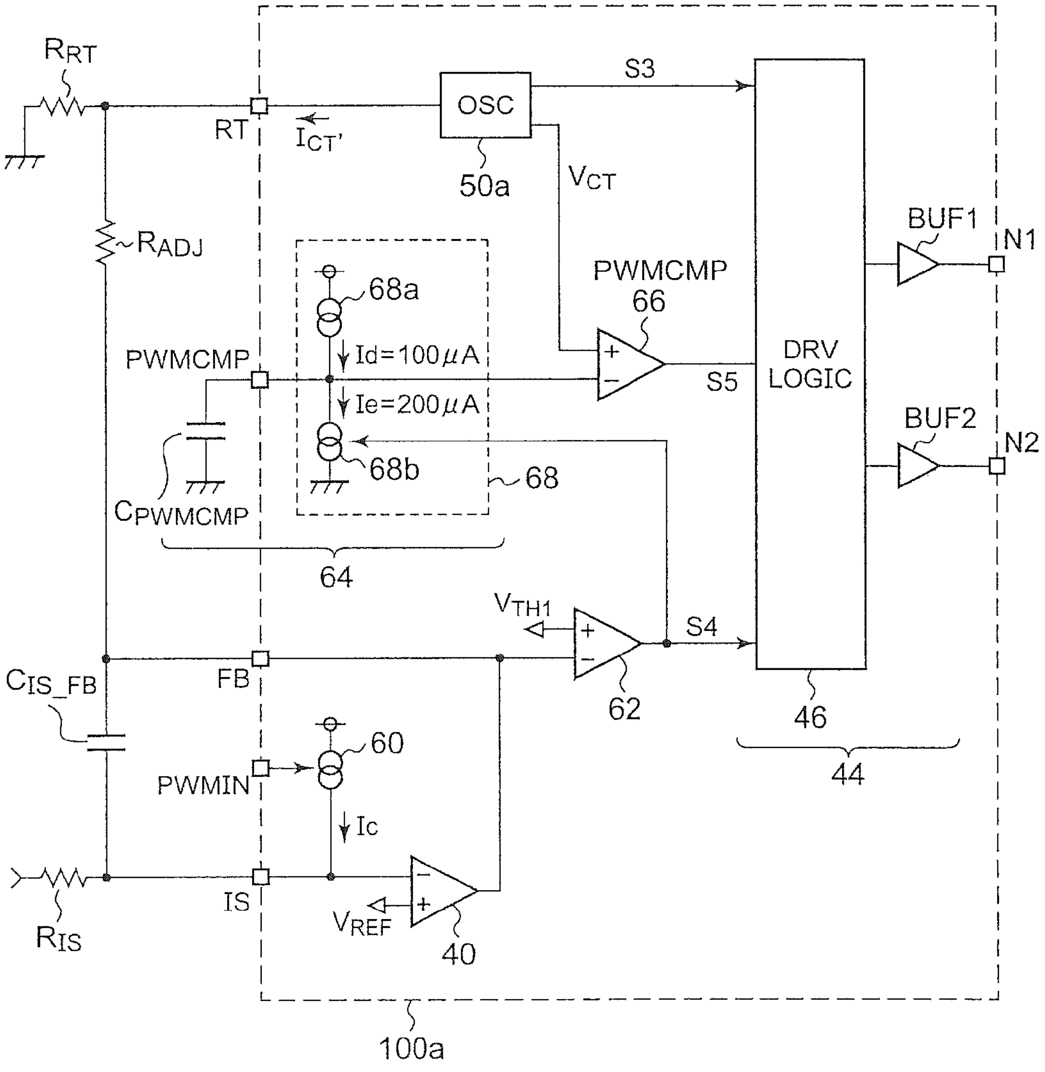
FIG. 5 is a circuit diagram which shows a part of a load driving circuit according to a second embodiment.

FIG. 5 is a circuit diagram which shows a part of a load driving circuit 4*a* according to a second embodiment. A control IC 100*a* includes a PWMIN terminal via which a burst dimming control signal (which will be referred to as the "PWMIN signal" hereafter) PWMIN is input. The PWMIN signal is supplied from an unshown DSP (Digital Signal Processor). The high level of the PWMIN signal is allocated to the on period, and the low level thereof is allocated to the off period.

When the PWMIN signal indicates the off period, i.e., when the PWMIN signal is low level, a burst current source 60 applies the current Ic (which functions as a current source) to the IS terminal, which raises the electric potential $V_{IS}$ at the IS terminal. When the PWMIN signal indicates the on period, i.e., when the PWMIN signal is high level, the output current of the burst current source 60 becomes zero.

A burst comparator 62 compares the voltage level $V_{FB}$ of the FB signal with a predetermined first threshold voltage $V_{TH1}$, and outputs a burst signal S4 that corresponds to the comparison result. When $V_{FB}>V_{TH1}$, the burst signal S4 is set to low level, and when $V_{FB}<V_{TH1}$, the burst signal S4 is set to high level. The burst signal S4 is input to the driving logic unit 46. The threshold voltage $V_{TH1}$ is set to 0.5 V, for example.

When the burst signal S4 is low level, the driving logic unit 46 outputs the driving pulses N1 and N2. When the burst signal S4 is high level, the driving logic unit 46 stops the supply of the driving pulses N1 and N2.

The above is the basic configuration of the load driving circuit 4*a*. Next, description will be made regarding the operation thereof.

Figure 6:
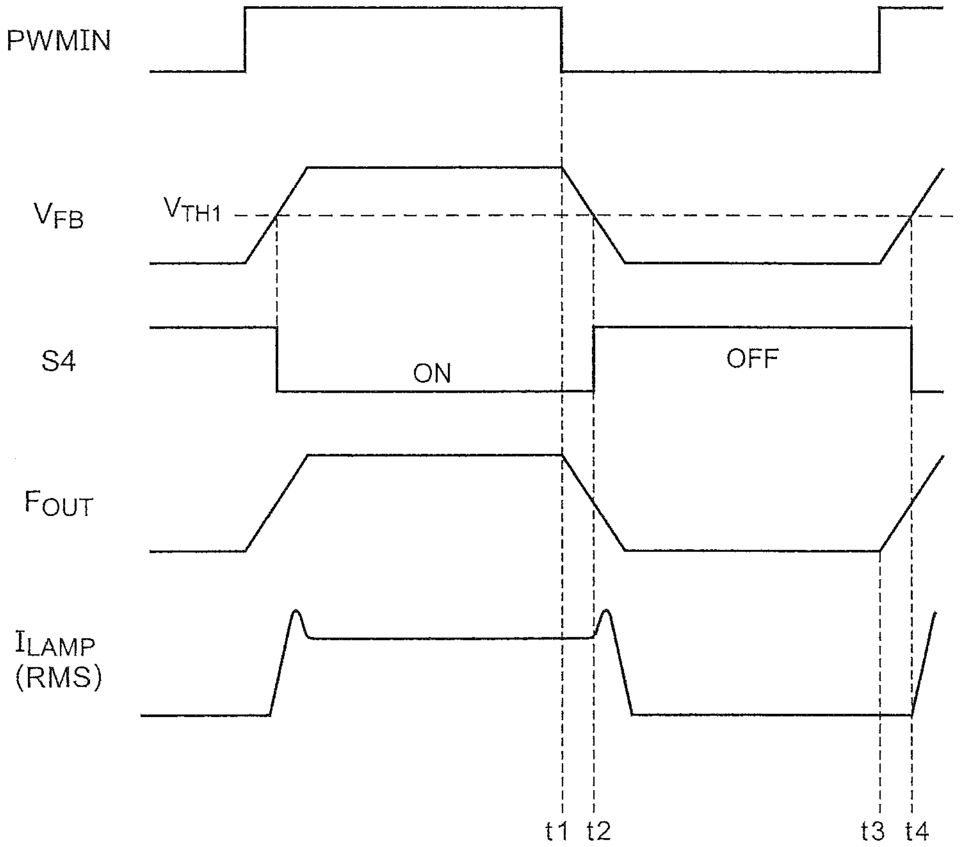
FIG. 6 is a time chart which shows the basic operation of the load driving circuit shown in FIG. 5.

FIG. 6 is a time chart which shows the basic operation of the load driving circuit 4*a* shown in FIG. 5. During a period in which the PWMIN signal is set to high level, the voltage level $V_{FB}$ of the FB signal is stabilized at a predetermined level. When the PWMIN signal transits to low level at the time point t1, a constant current Ic is applied to the IS terminal, which reduces the voltage level $V_{FB}$ of the FB signal. As the voltage level $V_{FB}$ is reduced, the frequency $F_{PFM}$ of the PFM signal S3 is reduced, which reduces the luminance level of the load 2. When the voltage level $V_{FB}$ becomes lower than the threshold voltage $V_{TH1}$ at the time point t2, the burst signal S4 is set to high level. In this state, the driving logic unit 46 stops the driving pulses N1 and N2. As a result, the supply of power to the load 2 is stopped, thereby turning off the load 2.

When the PWMIN signal returns to high level at the time point t3, the supply of the constant current Ic from the burst current source 60 is stopped, and the feedback voltage $V_{FB}$ starts to rise toward the previous level. When the feedback voltage $V_{FB}$ exceeds the threshold voltage $V_{TH1}$ at the time point t4, the driving pulses N1 and N2 are output again. Subsequently, the frequency $F_{PFM}$ of the PFM signal S3 rises until the luminance level of the load 2 reaches the target value.

The above is the basic operation of the load driving circuit 4*a*.

With a load driving circuit configured to perform PFM control, the lamp current cannot be set to zero using frequency control alone as shown in FIG. 4. In order to solve such a problem, the load driving circuit 4*a* generates the burst signal S4 based upon the result of comparison between the feedback voltage $V_{FB}$ and the threshold voltage $V_{TH1}$. With such an arrangement, during a period from t1 up to t2, the luminance level is reduced by means of PFM control. After the luminance level is reduced to a certain extent, the driving of the main transformer 20 is stopped using the burst signal S4. Thus, such an arrangement is capable of setting the lamp current to zero in the off period.

As shown in FIG. 6, In a case in which the PFM control and the burst dimming are performed at the same time, in some cases, such an arrangement leads to lamp current $I_{LAMP}$ overshoot. In some cases, this leads to audible noise from the transformer. Such a phenomenon is particularly conspicuous in a case in which the load is configured as an EEFL. In order to reduce such audible noise, the load driving circuit 4*a* shown in FIG. 5 performs PWM control, in addition to the PFM control.

Description will be made below regarding the configuration that relates to the PWM control. The load driving circuit 4*a* further includes a slope voltage generating unit 64 and a PWM comparator 66.

The slope voltage generating unit 64 generates a slope voltage $V_{PWMCMP}$ that gradually changes over time when level transition occurs in the burst signal S4. The slope voltage generating unit 64 includes a capacitor $C_{PWMCMP}$ and a charging/discharging circuit 68 configured to charge/discharge the capacitor $C_{PWMCMP}$. The capacitor $C_{PWMCMP}$ is externally connected to the PWMCMP terminal.

When the burst signal S4 is high level, the charging/discharging circuit 68 draws a current from the capacitor $C_{PWMCMP}$ (functions as a current sink). Conversely, when the burst signal S4 is low level, the charging/discharging circuit 68 supplies a current to the capacitor $C_{PWMCMP}$ (functions as a current source).

The charging/discharging circuit 68 includes a source current source 68*a* and a sink current source 68*b*. The source current source 68*a* supplies a constant current Id to the capacitor $C_{PWMCMP}$. The sink current source 68*b* is switchable between the on state and the off state according to the burst signal S4. In the on state, the sink current source 68*b* draws, from the capacitor $C_{PWMCMP}$, a current Ie that is greater than the constant current Id.

An oscillator 50*a* functionally represents the oscillator 50, the current generating transistor M3, and the second error amplifier 42 shown in FIG. 1. That is to say, the oscillator 50*a* is configured to generate the PFM signal S3 having a frequency that is proportional to the frequency control current $I_{CT}$ that flows from the RT terminal to a circuit external to the control IC 100, and to output a cyclic signal $V_{CT}$ having a ramp waveform that is synchronized to the PFM signal S3.

The PWM comparator 66 compares the cyclic signal $V_{CT}$ with the slope voltage $V_{PWMCMP}$, and outputs a PWM signal S5 subjected to pulse width modulation. The PWM signal S5 has the same frequency as that of the PFM signal S3. Furthermore, the PWM signal S5 and the PFM signal S3 are synchronized.

The driving logic unit 46 performs an operation on the PWM signal S5 and the PFM signal S3, and the signal thus obtained is alternately distributed between the driving pulses N1 and N2.

The above is the description regarding the PWM control operation of the load driving circuit 4*a*. Next, description will be made regarding the operation thereof.

Figure 7:
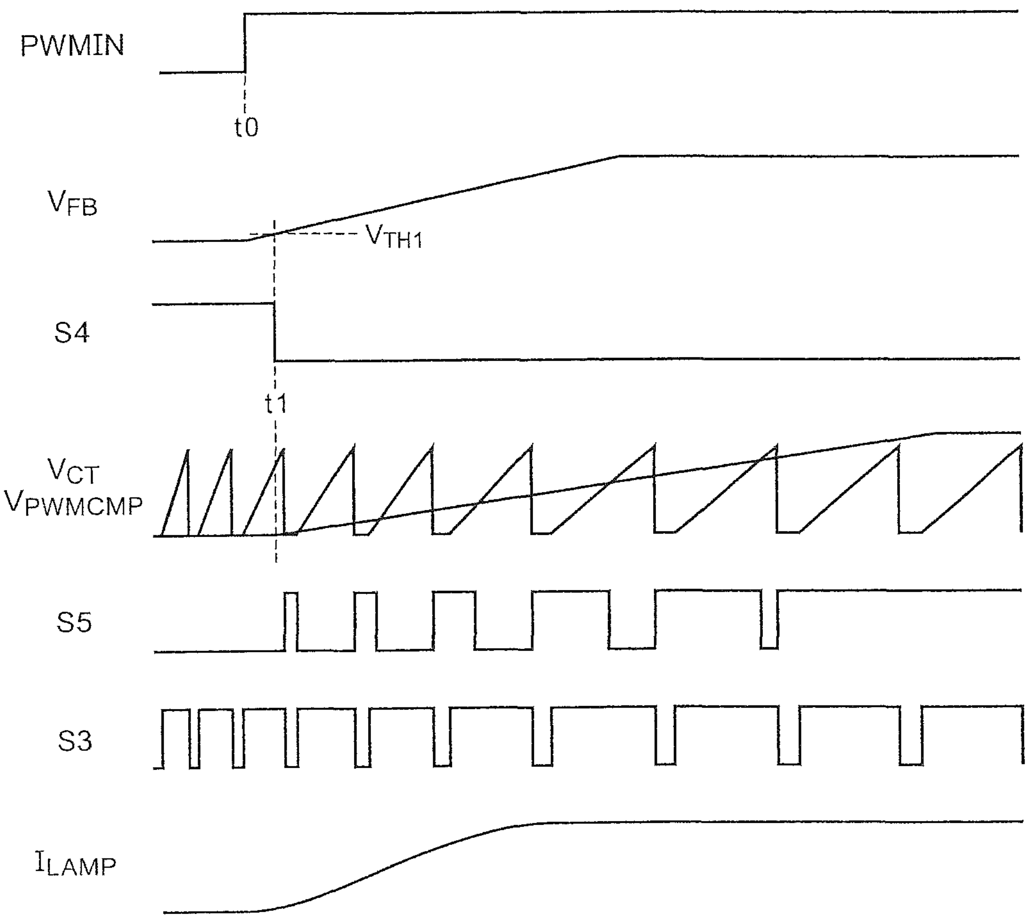
FIG. 7 is a time chart which shows the operation of the load driving circuit shown in FIG. 5.

FIG. 7 is a time chart which shows the operation of the load driving circuit 4*a* shown in FIG. 5. When the PWMIN signal transits to high level, the voltage level $V_{FB}$ of the FB signal starts to rise over time. In this state, the frequencies of the PFM signal S3 and the cyclic signal $V_{CT}$ are reduced over time.

When the voltage $V_{FB}$ reaches the threshold voltage $V_{TH1}$ at the time point t1, the burst signal S4 transits to low level, and the slope voltage $V_{PWMCMP}$ starts to rise. The frequency of the PWM signal S5 is reduced over time. Furthermore, the duty ratio thereof is increased over time, and eventually becomes 100%.

The driving logic unit 46 combines the PFM signal S3 and the PWM signal S5 by means of a logical operation so as to generate the driving pulses N1 and N2. The frequency $F_{OUT}$ of the driving pulses N1 and N2 is reduced over time. Furthermore, the duty ratios of the driving pulses N1 and N2 are each increased over time, and eventually they each reach the maximum duty ratio established for the PFM signal S3.

After the burst signal S4 transits to low level, the driving of the main transformer 20 is started according to the driving pulses N1 and N2. Subsequently, the frequencies of the driving pulses N1 and N2 each drop, which increases the lamp current $I_{LAMP}$. In this state, the duty ratios of the driving pulses N1 and N2 gradually rise. Thus, such an arrangement provides a gradual increase in the lamp current $I_{LAMP}$, as compared with an arrangement which does not support such PWM control. As a result, such an arrangement suppresses lamp current $I_{LAMP}$ overshoot, thereby suppressing audible noise from the coil.

When the burst signal S4 transits from high level to low level, in contrast with the waveform diagram shown in FIG. 7, the slope voltage $V_{PWMCMP}$ drops over time, and accordingly the duty ratio of the PWM signal S5 is concurrently reduced over time. As a result, such an arrangement is capable of gradually reducing the lamp current $I_{LAMP}$ over time, and of gradually turning off the lamp.

The above is the description regarding the burst dimming and the PWM control.

[Modification]

With such an arrangement configured to perform such PWM control as described above, the duty ratios of the driving pulses N1 and N2 can be controlled in a range from 0% to 100%. With such an arrangement, when the duty ratios of the driving pulses N1 and N2 are set to zero, no electric power is supplied to the load 2. Thus, such an arrangement is capable of setting the lamp current $I_{LAMP}$ to zero without employing the burst signal S4.

Thus, in a case in which such PWM control is provided as an additional control operation, the PWM signal S5 may be reduced to 0% in the off period while omitting the input of the burst signal S4 to the driving logic unit 46. With such an arrangement, the PWMIN signal should be employed as a control signal for the charging/discharging circuit 68, instead of the burst signal S4.

Lastly, description will be made regarding the control IC 100 including the features of the load driving circuit according to the first and second embodiments.

Figure 8:
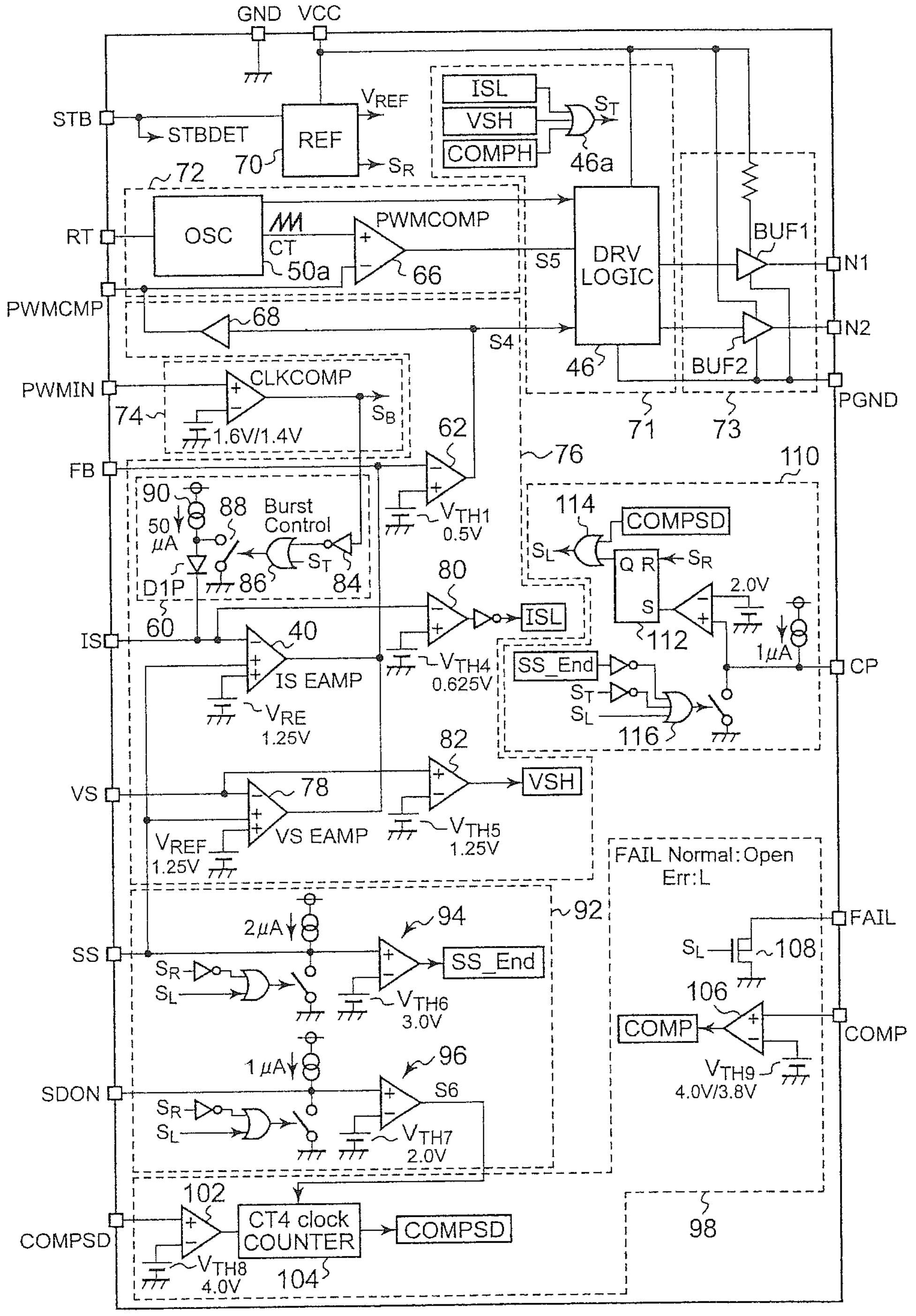
FIG. 8 is a block diagram which shows a configuration of a control IC.

FIG. 8 is a block diagram which shows a configuration of a control IC 100*b*. First, description will be made regarding terminals (pins) thereof.

1.1 Power Supply Terminal (VCC)

The power supply terminal (VCC) receives the power supply voltage VCC from an external circuit.

1.2 Standby Terminal (STB)

The standby terminal (STB) receives, as an input signal, a control signal that indicates whether or not the control IC 100*b* is to be set to the standby state. When the STB signal is high level, the control IC 100*b* is set to the operating state, and when the STB signal is low level, the control IC 100*b* is set to the standby state.

1.3 Ground Terminal (GND)

The ground terminal receives the ground voltage from an external circuit.

1.4 Resistor Connection Terminal (RT)

The resistor connection terminal (RT) is a terminal to which the current generating resistor $R_{RT}$ described above is connected.

1.5 Feedback Terminal (FB)

The feedback terminal (FB) is a terminal to which the output terminal of the first error amplifier 40 described above is connected.

1.6 Current Detection Terminal (IS)

The current detection terminal (IS) receives, as a feedback signal, the IS signal that indicates the load current (lamp current), which is one of the detection signals from the load.

1.7 Voltage Detection Terminal (VS)

The voltage detection terminal (VS) receives, as a feedback signal, a detection signal (which will also be referred to as the "VS signal") that indicates the driving voltage, which is one of the detection signals from the load.

1.8 Slope Voltage Terminal (PWMCMP)

The slope voltage terminal (PWMCMP) is a terminal configured to be connected to the slope voltage generating capacitor $C_{PWMCMP}$.

1.9 Timer Terminal (CP)

The timer terminal (CP) is a terminal configured to be connected to a timer (CP timer) capacitor $C_{CP}$.

1.10 Burst Dimming Control Terminal (PWMIN)

The burst dimming control terminal (PWMIN) is a terminal via which the aforementioned PWMIN signal is input.

1.11 Shutdown Terminal (SDON)

The shutdown terminal (SDON) is a terminal configured to be connected to a shutdown timer capacitor $C_{SDON}$.

1.12 Soft Start Terminal (SS)

The soft start terminal (SS) is a terminal configured to be connected to a soft start capacitor $C_{SS}$.

1.13 Fail Terminal (FAIL)

The fail terminal (FAIL) is a terminal via which notice of a fail state detected by the control IC is transmitted to an external circuit.

1.14 Overvoltage Detection Terminal (COMPSD)

The overvoltage detection terminal (COMPSD) is a terminal to which the voltage to be subjected to overvoltage protection is input. When the voltage input to the overvoltage detection terminal (COMPSD) exceeds a predetermined threshold voltage $V_{TH2}$, circuit protection is applied after a predetermined period of time, which is counted by the CP timer, has elapsed.

1.15 Overvoltage Detection Terminal (COMP)

The overvoltage detection terminal (COMP) is a terminal to which the voltage to be subjected to overvoltage protection is input. When the voltage input to the overvoltage detection terminal (COMP) exceeds a predetermined threshold voltage $V_{TH3}$, circuit protection is immediately applied.

1.16 Power Ground Terminal (PGND)

The power ground terminal (PGND) is a terminal to which is input the ground voltage to be supplied to the circuit block arranged as the output stage.

1.17 Output Terminal (N1)

The output terminal (N1) is a terminal via which the driving pulse N1 is output.

1.18 Output Terminal (N2)

The output terminal (N2) is a terminal via which the driving pulse N2 is output.

The above is the description regarding the input/output pins. Next, description will be made regarding the internal configuration of the control IC 100*b*.

When the STB signal switches to high level, a reference voltage source 70 generates a reference voltage $V_{REF}$. When the reference voltage $V_{REF}$ is initiated, the reference voltage source 70 asserts a standby/undervoltage lockout (STB-UVLO) release signal $S_R$.

A logic block 71 includes a driving logic unit 46 and an OR gate 46*a*. When at least one of an ISL signal which is asserted in an abnormal current state, a VSL signal which is asserted in an abnormal voltage state, or a COMP signal which is asserted in an overvoltage state, is asserted, the OR gate 46*a* asserts a protection detection signal $S_T$.

An oscillator block 72 includes the oscillator 50 and the PWM comparator 66 described above.

A driver block 73 includes the output buffer units BUF1 and BUF2 described above.

A dimming control block 74 includes a comparator CLK-COMP configured to compare the PWMIN signal with a predetermined threshold voltage. The output signal of the comparator CLKCOMP is output as a burst signal $S_B$. The burst signal $S_B$ has the same meaning as the PWMIN signal.

An error amplifier block 76 includes the first error amplifier 40, the burst current source 60, the burst comparator 62, and the charging/discharging circuit 68, described above. In addition, the error amplifier block 76 further includes the following circuit.

A third error amplifier (VS_EAMP) 78 generates a feedback signal FB (which will also be referred to as the "FB signal") that corresponds to the difference between the detection signal VS that indicates the electrical state of the load 2 and the predetermined first reference voltage $V_{REF}$. A capacitor $C_{VS\_FB}$ is externally arranged between the VS terminal and the FB terminal. The output terminal of the third error amplifier 78 and the output terminal of the first error amplifier 40 are connected together so as to form a common output terminal. The lower of these output voltages is passed, and develops at the FB terminal.

With such a configuration, immediately after start-up, the control IC 100 performs feedback control such that the voltage at the load 2 approaches a target value. Subsequently, the control IC 100 performs feedback control such that the load current approaches a target value.

An IS comparator 80 compares the IS signal with a predetermined threshold voltage $V_{TH4}$ so as to detect an abnormal current state. When an abnormal current state occurs, the ISL signal is asserted.

A VS comparator 82 compares the VS signal with a predetermined threshold voltage $V_{TH5}$ so as to detect an abnormal voltage state. When an abnormal voltage state (e.g., a malfunction due to the lamp being in an open circuit state) occurs, the VSH signal is asserted.

A protection detection signal $S_T$ is input to the burst current source 60. The protection detection signal $S_T$ is set to high level in a period in which a protection operation is to be performed, as described later. An inverter 84 inverts the burst signal $S_B$. An OR gate 86 generates the logical OR of the inverted burst signal $S_B$# ("#" represents logical inversion) and the protection detection signal $S_T$. A current source 90 is connected to the IS terminal via a diode D11. When the output signal of the OR gate 86 is high level, the switch 88 is turned on, and when the output signal of the OR gate 86 is low level, the switch 88 is turned off. When the switch 88 is turned on, the switch 88 draws the current generated by the current source 90, and accordingly, the voltage $V_{IS}$ at the IS terminal does not rise. When the switch 88 is turned off, the current generated by the current source 90 is supplied to the IS terminal, and accordingly, the voltage $V_{IS}$ at the IS terminal rises over time. Thus, such an arrangement performs the aforementioned burst dimming.

A soft start block 92 includes a soft start circuit 94 configured to generate a soft start voltage $V_{SS}$ and a timer circuit 96. When the release signal $S_R$ is asserted, the soft start circuit 94 charges the capacitor that is externally connected to the SS terminal, thereby generating the soft start voltage $V_{SS}$ that rises over time. When the soft start voltage $V_{SS}$ rises to the a threshold voltage $V_{TH6}$, a comparator 95 asserts an SS_END signal which indicates the completion of the soft start operation.

The soft start voltage $V_{SS}$ is supplied to the first error amplifier 40 and the third error amplifier 78. The first error amplifier 40 amplifies the difference between the voltage $V_{IS}$ of the IS signal and the lower of the reference signal $V_{REF}$ and the soft start voltage $V_{SS}$. The third error amplifier 78 amplifies the difference between the voltage $V_{VS}$ of the VS signal and the lower of the reference signal $V_{REF}$ and the soft start voltage $V_{SS}$. With such an arrangement, in the start-up operation, the voltage and the current supplied to the load gradually rise, following the soft start voltage $V_{SS}$.

The timer circuit 96 outputs a signal S6 which is asserted after a predetermined period of time elapses after the release signal $S_R$ is asserted.

A comparator block 98 detects whether or not an overvoltage state has occurred, and outputs a fail signal. A comparator 102 compares the voltage at the COMPSD terminal with a threshold voltage $V_{TH8}$. When the overvoltage state continues for a predetermined period of time, the counter 104 asserts the COMPSD signal. A comparator 106 compares the voltage at the COMP terminal with a threshold voltage $V_{TH9}$. When an overvoltage state is detected, the comparator 106 asserts the COMP signal.

The output transistor 108 is arranged such that the drain thereof is connected to the FAIL terminal, and the latch signal $S_L$ is input to the gate thereof. When the control IC 100 detects an abnormal state, the latch signal $S_L$ is asserted (set to high level). When the control IC 100 is in the normal state, the FAIL terminal is set to the high-impedance state, and when the control IC 100 is in the abnormal state, the FAIL terminal is set to low level.

When the protection detection signal $S_T$ indicates that there is abnormal state (high level), a timer block 110 performs time counting. When such an abnormal state continues for a period of time set in the timer block 110, a flip-flop 112 is set. An OR gate 114 generates a latch signal $S_L$ which is the logical OR of the COMPSD signal and the output signal Q of the flip-flop 112. When the release signal $S_R$ is asserted, the flip-flop 112 is reset.

An OR gate 116 masks the protection detection signal $S_T$ using an SS_END signal. This allows false detection of an abnormal state to be prevented before the completion of the soft-start operation. Furthermore, by inputting a latch signal $S_L$ to the OR gate 116, such an arrangement is capable of preventing the timer block 110 from repeatedly operating after the latch signal $S_L$ is asserted.

The above is the configuration of the control IC 100*b*. Next, description will be made regarding a peripheral circuit for the control IC 100*b*.

Figure 9:
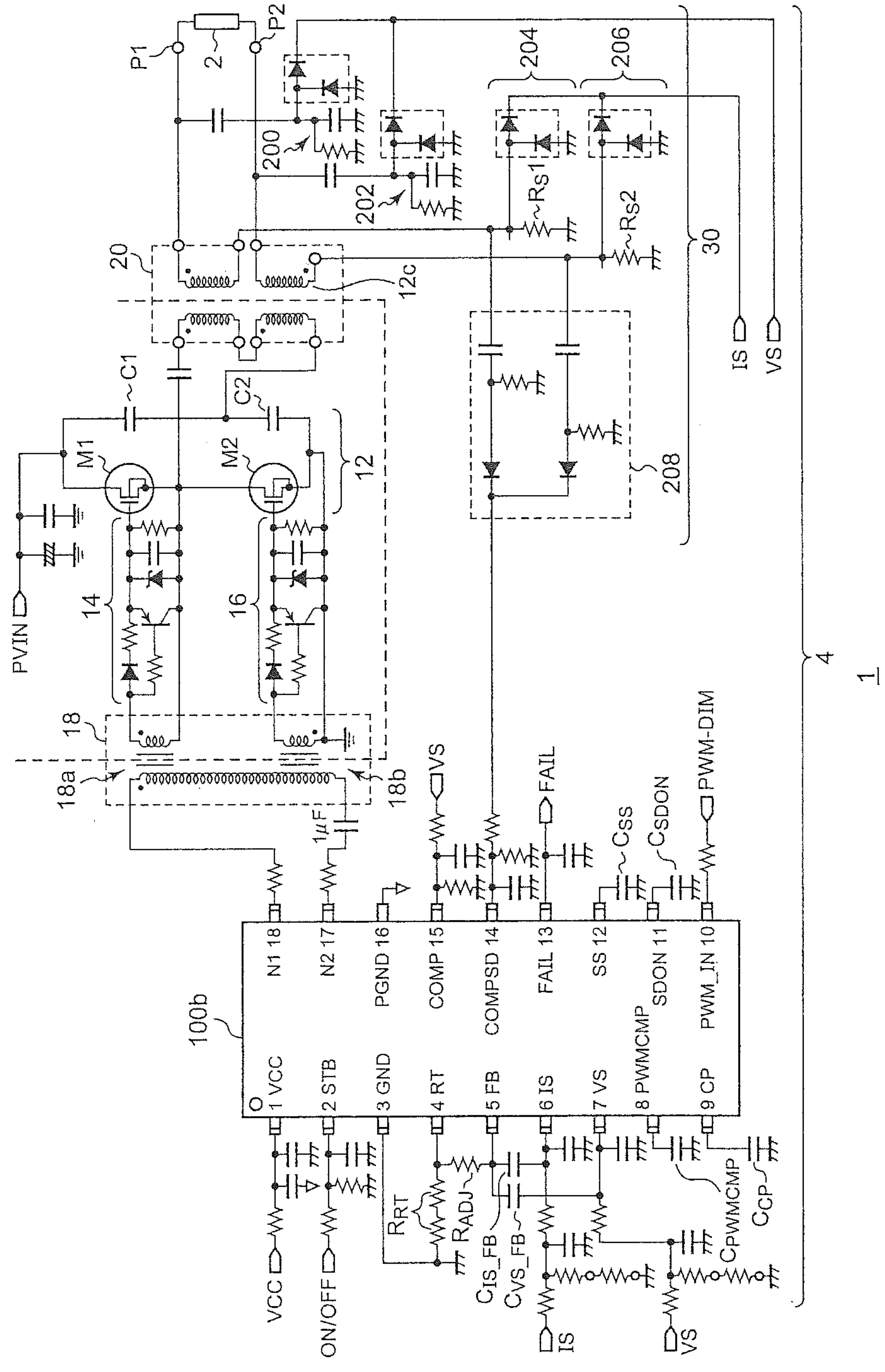
FIG. 9 is a peripheral circuit diagram of the control IC shown in FIG. 8.

FIG. 9 is a circuit diagram showing a peripheral circuit for the control IC 100*b* shown in FIG. 8. FIG. 9 shows an arrangement in which the load 2 is configured as a fluorescent lamp.

The output circuit 30 includes voltage detection units 200 and 202 and current detection units 204 and 206. The voltage detection units 200 and 202 respectively divide the voltages that develop at the two terminals P1 and P2 of the load 2, and each perform a rectification operation, so as to generate a VS signal. The current detection units 204 and 206 convert the current that flows through the load 2 into voltages by means of the detection resistors Rs1 and Rs2, and rectify the voltages thus converted, so as to generate an IS signal. Furthermore, the voltages that develop at the detection resistors Rs1 and Rs2 are input to the COMPSD terminal via a filter 208. Thus, the control IC 100*b* is capable of detecting an abnormal state of the lamp current.

With such a configuration, the fluorescent lamp can be appropriately driven. It should be noted that FIG. 9 shows an arrangement in which the load 2 is arranged between the terminals P1 and P2. Also, an arrangement may be made in which such loads 2 are respectively connected to the terminals P1 and P2.

Figure 10:
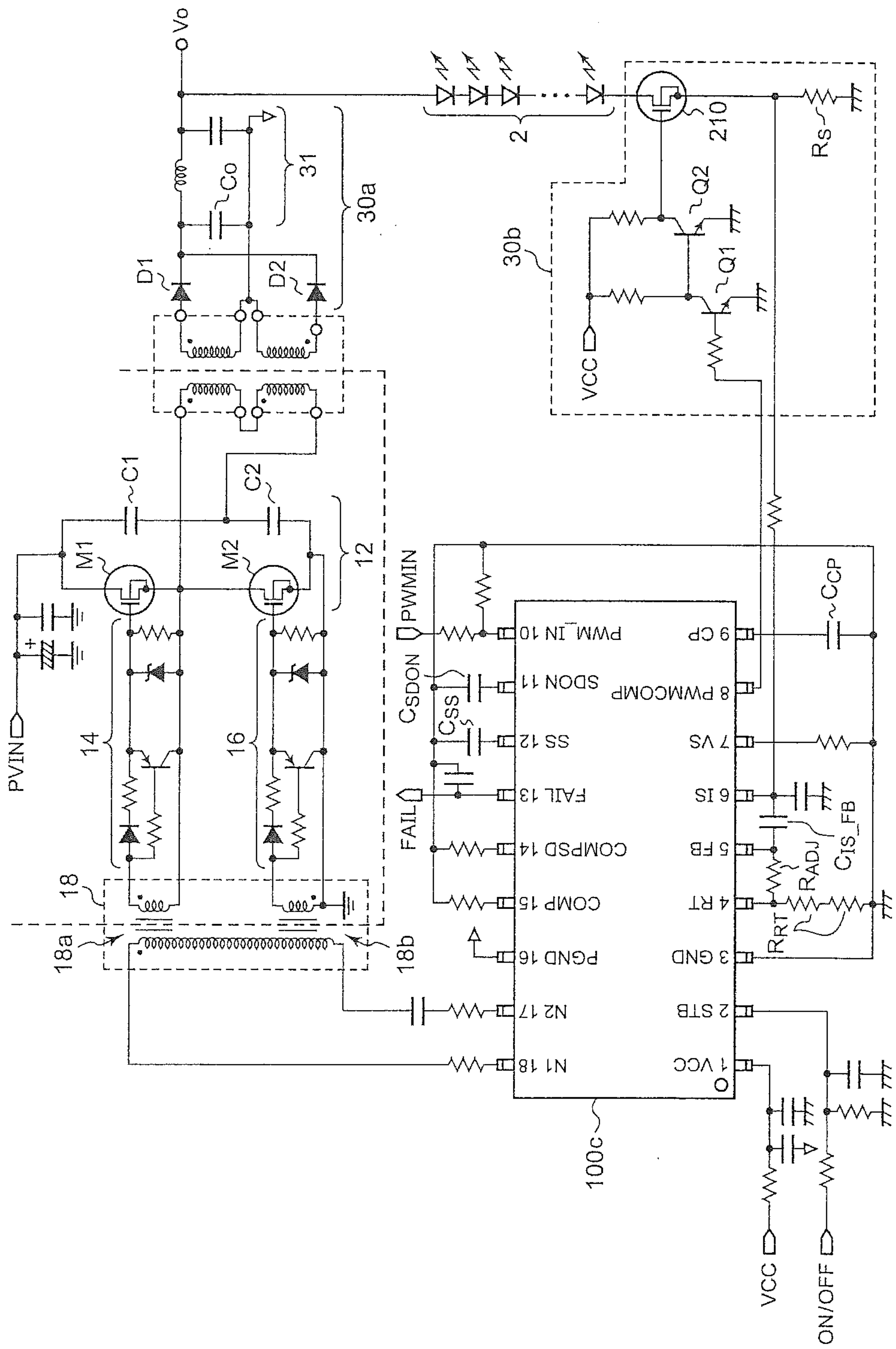
FIG. 10 is a peripheral circuit diagram of the control IC.

FIG. 10 is a peripheral circuit diagram of a control IC 100*c*. FIG. 10 shows an arrangement in which the load 2 is configured as an LED. The control IC 100*c* shown in FIG. 10 includes a PWMCOMP terminal, instead of or in addition to the PWMCMP terminal. The PWMCOMP terminal is arranged in order to output the pulse width modulated PWM signal S5 generated by the PWM comparator 66 shown in FIG. 8.

The output circuit 30 includes a DC conversion output circuit 30*a* and a current driver 30*b*. The output circuit 30*a* includes rectifier diodes D1 and D2, an output capacitor Co, and a smoothing circuit 31.

The current driver 30*b* includes a PWM transistor 210 arranged on a path of the load 2 and a detection resistor Rs. A voltage drop that is proportional to the LED current occurs at the detection resistor Rs. This voltage drop is fed back as the detection signal IS. Furthermore, the gate of the PWM transistor 210 is connected to the PWMCOMP terminal via the Darlington-connected transistors Q1 and Q2. Such a configuration allows the LED to be appropriately driven.

With the control IC 100*b* shown in FIG. 8, or with other kinds of ICs, in some cases, the user desires that the IC include terminals having improved breakdown voltage. In order to satisfy such a demand, in a case in which circuit elements such as transistors, resistors, etc., are designed to have improved breakdown voltage before they are connected to such a terminal required to have high breakdown voltage, such an arrangement leads to an increased circuit area. Furthermore, in some cases, such a circuit element having such improved breakdown voltage has characteristics that differ from those of a circuit element that has not been subjected to breakdown voltage improvement. Accordingly, in this case, there is a need to verify the circuit design again.

Figure 11:
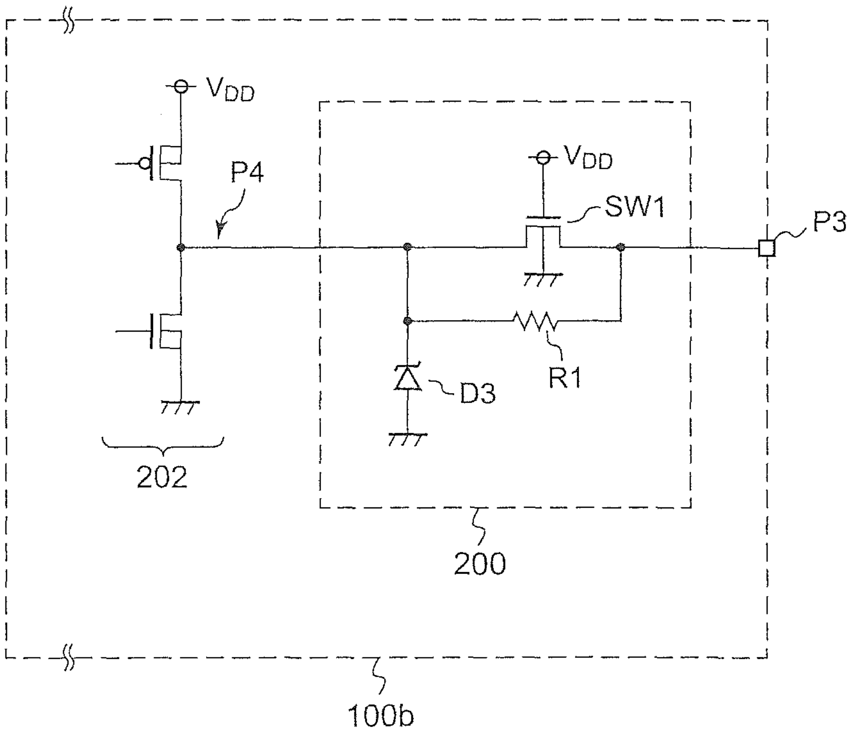
FIG. 11 is a circuit diagram which shows a configuration of a protection circuit.

Here, in a case in which a terminal is required to have a high breakdown voltage, there is a demand for an IC having a terminal with a breakdown voltage that can be raised without modifying the internal circuit connected to the terminal, which is convenient. FIG. 11 is a circuit diagram which shows a configuration of a protection circuit 200. Examples of an I/O terminal P3 required to have a high breakdown voltage include an RT terminal, PWMCMP terminal, FB terminal, SS terminal, SDON terminal, CP terminal, and so forth. However, such an I/O terminal P3 is not restricted in particular.

The protection circuit 200 is arranged between the I/O terminal P3 and an internal circuit 202 to be protected. FIG. 11 shows the internal circuit 202 with a push-pull output stage. However, the configuration of the internal circuit 202 is not restricted to such an arrangement.

The protection circuit 200 includes a switch SW1 arranged between the I/O terminal P3 and an output terminal P4 of the internal circuit 202, a resistor R1 arranged in parallel with the switch SW1, and a Zener diode D3 arranged between the output terminal P4 of the internal circuit 202 and the ground terminal such that the cathode of the Zener diode D3 is arranged on the output terminal P4 side thereof.

The switch SW1 is configured such that, when the voltage at the I/O terminal P3 is lower than a predetermined threshold, the switch SW1 is turned on, and when the voltage at the I/O terminal P3 is higher than the threshold, the switch SW1 is turned off. For example, the switch SW1 is configured as an N-channel MOSFET arranged such that a fixed voltage (power supply voltage $V_{DD}$) is applied to the gate thereof, and the back gate thereof is grounded. As such a switch SW1, there is a need to employ an element having a breakdown voltage that is somewhat high.

The Zener diode D3 preferably has a Zener voltage $V_Z$ on the order of 5.5 V. The resistor R1 preferably has a resistance value on the order of 100 kΩ.

The above is the configuration of the protection circuit 200. In a state in which the electric potential at the I/O terminal P3 is low, the switch SW1 is turned on. In this state, the I/O terminal P3 and the output terminal P4 are connected via a low impedance, and thus, the effects of the protection circuit 200 are negligible. When the electric potential at the I/O terminal P3 becomes higher than a threshold value, the switch SW1 is turned off, which raises the output impedance. In this state, the electric potential at the output terminal P4 is clamped by the Zener diode D3, and the electric potential at the I/O terminal P3 is clamped by the Zener diode D3 and the resistor R1.

As described above, by employing the protection circuit 200 shown in FIG. 11, such an arrangement meets the breakdown voltage requirement without changing the breakdown voltage of the circuit elements that comprise the internal circuit 202. Furthermore, such an arrangement involves only a very slight increase in the circuit area, which is also an advantage.

Figure 12:
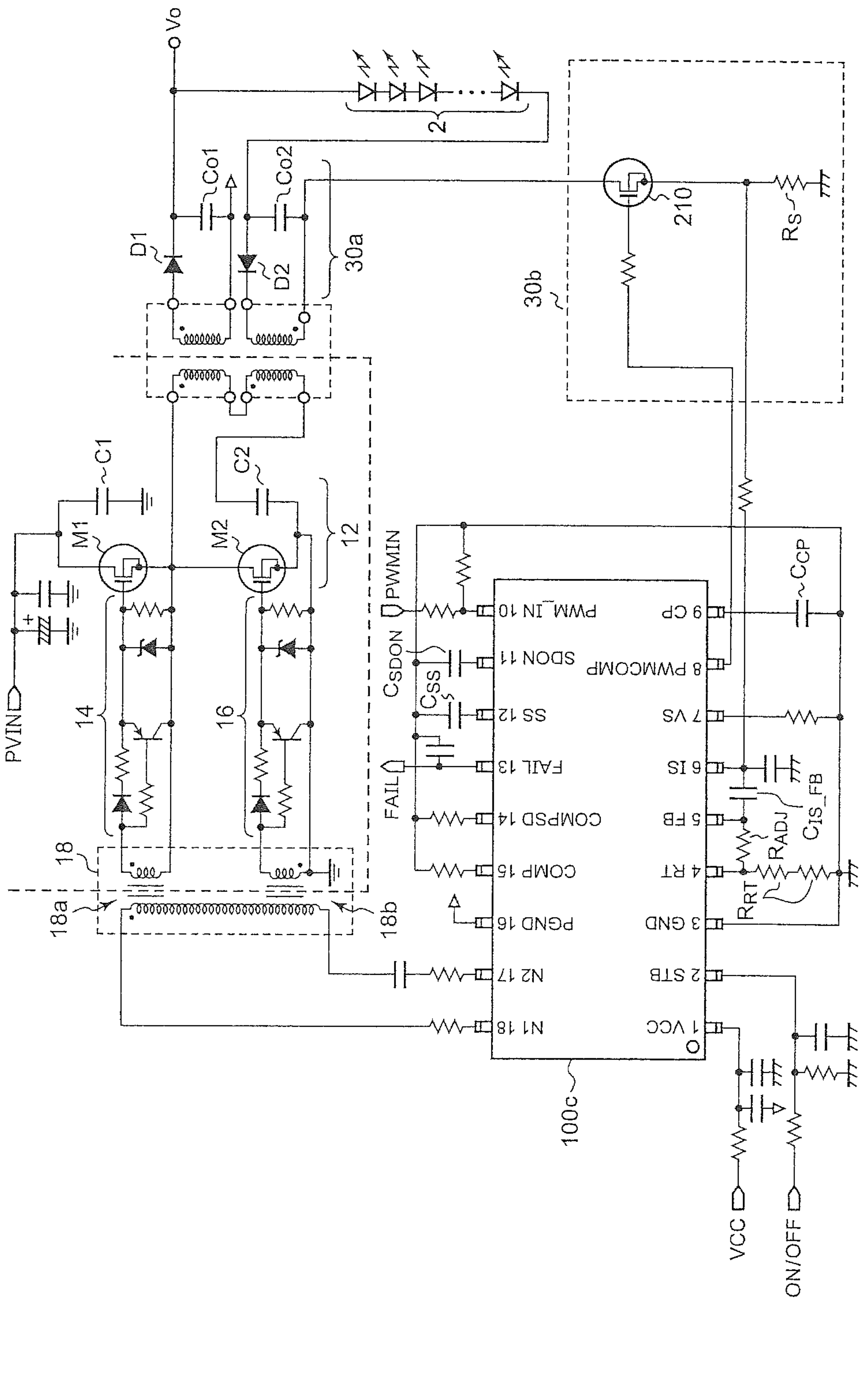
FIG. 12 is another peripheral circuit diagram of the control IC.

FIG. 12 is a circuit diagram which shows a modification of an arrangement shown in FIG. 10. With such a modification, the load 2 is arranged between one terminal and the other terminal of the output circuit 30*a*. The rectifier diode D2 is arranged in the direction that is the reverse of that shown in FIG. 10. Such a modification is capable of appropriately driving an LED.

Figure 13:
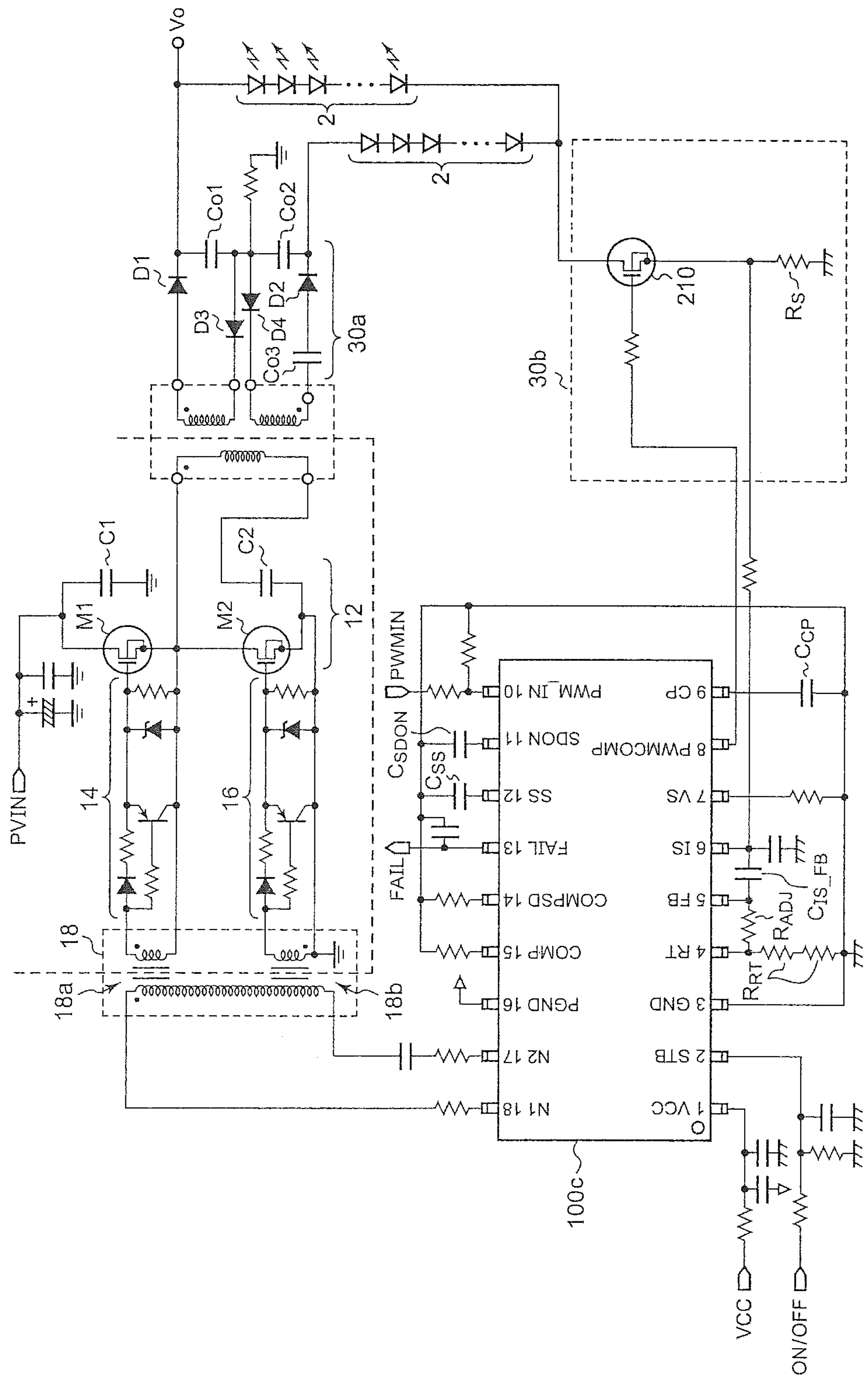
FIG. 13 is yet another peripheral circuit diagram of the control IC.

FIG. 13 is a circuit diagram which shows a modification of an arrangement shown in FIG. 10. FIG. 13 shows an arrangement configured to drive two loads 2. The output circuit 30*a* includes capacitors Co1 through Co3 and diodes D1 through D4. The anodes of the two loads 2 are respectively connected to the two output terminals of the output circuit 30*a*. The cathodes of the two loads 2 are connected together to the drain of the PWM transistor 210 included in the current driver 30*b*.

With such a modification, multiple LEDs can be driven at the same time.

The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention.

The topology of the main transformer driving unit 10 is not restricted to such an arrangement shown in FIG. 1. For example, the bridge circuit may be directly driven without employing such a pulse transformer 18. Also, a full-bridge circuit may be employed instead of the half-bridge circuit 12.

The high level and low level settings of the logical values used in each logic circuit have been described in the present embodiment for exemplary purposes only. These settings can be freely modified by inverting the signals using inverters or the like.

While the preferred embodiments of the present invention have been described using specific terms, such description is for illustrative purposes only, and it is to be understood that changes and variations may be made without departing from the spirit or scope of the appended claims.

What is claimed is:

1. A load driving circuit configured to convert an input voltage into a driving signal, and to supply the driving signal thus converted to a load, the load driving circuit comprising:

a main transformer arranged such that the load is connected to a secondary winding side thereof;

a first error amplifier configured to generate a feedback signal that corresponds to the difference between a detection signal which indicates an electrical state of the load and a predetermined first reference voltage;

a current generating transistor;

a current generating resistor arranged between the current generating transistor and a fixed voltage terminal;

a second error amplifier arranged such that a first input terminal thereof receives, as an input signal, an electric potential at a connection node that connects the current generating transistor and the current generating resistor, a predetermined second reference voltage is input to a second input terminal thereof, and an output terminal thereof is connected to a control terminal of the current generating transistor;

an adjustment resistor arranged between an output terminal of the first error amplifier and a connection node that connects the current generating transistor and the current generating resistor;

an oscillator configured to alternately repeat a state in which a capacitor is charged using a charging current that corresponds to a frequency control current that flows through the current generating transistor and a state in which the capacitor is discharged, so as to output a pulse frequency modulation signal having an edge synchronized to the charge/discharge transition; and a main transformer driving unit configured to drive a primary winding of the main transformer according to the pulse frequency modulation signal.

2. A load driving circuit according to claim 1, wherein the oscillator comprises:

a capacitor arranged such that one terminal thereof is set to a fixed electric potential;

a charging circuit configured to supply, to the capacitor, a charging current that is proportional to the frequency control current that flows through the current generating transistor;

a discharging transistor arranged between the capacitor and a fixed voltage terminal;

a peak detection comparator configured to assert a set signal when a voltage that develops at the other terminal of the capacitor reaches a predetermined threshold voltage;

a maximum duty ratio setting circuit configured to assert a reset signal after a predetermined delay time elapses after the set signal is asserted; and a flip-flop configured to generate an output signal having a level that transits every time the set signal or the reset signal is asserted, and to output the output signal thus generated to a control terminal of the discharging transistor.

3. A load driving circuit according to claim 2, wherein the maximum duty ratio setting circuit is configured to adjust the delay time such that it is inversely proportional to the frequency control current.

4. A load driving circuit according to claim 3, wherein the maximum duty ratio setting circuit is configured to set a lower limit value for the delay time.

5. A load driving circuit according to claim 1, wherein the main transformer driving unit comprises:

a half-bridge circuit connected to a primary winding of the main transformer;

a high-side driver configured to drive a high-side transistor of the half-bridge circuit;

a low-side driver configured to drive a low-side transistor of the half-bridge circuit;

a pulse transformer arranged such that a secondary winding thereof is connected to the high-side driver and the low-side driver; and a pulse transformer driving unit configured to apply a driving pulse to a primary winding of the pulse transformer according to the pulse frequency modulation signal.

6. A load driving circuit according to claim 5, wherein the secondary winding of the pulse transformer, the high-side driver, the low-side driver, the half-bridge circuit, and the primary winding of the main transformer are arranged in a primary region, and the other components are arranged in a secondary region that is electrically insulated from the primary region.

7. A load driving circuit according to claim 1, wherein the load is configured as a fluorescent lamp, and wherein the load driving circuit is configured to drive the load according to a driving signal that develops at the secondary winding of the main transformer.

8. A load driving circuit according to claim 1, wherein the load is configured as a light emitting diode, and wherein the secondary winding of the main transformer comprises a first coil and a second coil arranged such that one terminal of each coil is grounded, and such that they have opposite polarities, and wherein the load driving circuit comprises:

an output capacitor arranged such that one terminal thereof is grounded;

a first diode arranged between the other terminal of the first coil and the other terminal of the output capacitor; and a second diode arranged between the other terminal of the second coil and the other terminal of the output capacitor, and wherein the light emitting diode is driven according to the driving signal smoothed by the output capacitor.

9. A light emitting apparatus comprising:

a light emitting device; and a load driving circuit configured to drive the light emitting device, wherein the load driving circuit is configured to convert an input voltage into a driving signal, and to supply the driving signal thus converted to a load, and the load driving circuit comprises:

a main transformer arranged such that the load is connected to a secondary winding side thereof;

a first error amplifier configured to generate a feedback signal that corresponds to the difference between a detection signal which indicates an electrical state of the load and a predetermined first reference voltage;

a current generating transistor;

a current generating resistor arranged between the current generating transistor and a fixed voltage terminal;

a second error amplifier arranged such that a first input terminal thereof receives, as an input signal, an electric potential at a connection node that connects the current generating transistor and the current generating resistor, a predetermined second reference voltage is input to a second input terminal thereof, and an output terminal thereof is connected to a control terminal of the current generating transistor;

an adjustment resistor arranged between an output terminal of the first error amplifier and a connection node that connects the current generating transistor and the current generating resistor;

an oscillator configured to alternately repeat a state in which a capacitor is charged using a charging current that corresponds to a frequency control current that flows through the current generating transistor and a state in which the capacitor is discharged, so as to output a pulse frequency modulation signal having an edge synchronized to the charge/discharge transition; and a main transformer driving unit configured to drive a primary winding of the main transformer according to the pulse frequency modulation signal.

10. A light emitting apparatus according to claim 9, wherein the light emitting device is configured as a fluorescent lamp.

11. A light emitting apparatus according to claim 9, wherein the light emitting device is configured as a light emitting diode.

12. A display apparatus comprising:

a liquid crystal panel; and a light emitting apparatus configured as a backlight arranged on the back face of the liquid crystal panel, wherein the light emitting apparatus comprises:

a light emitting device; and a load driving circuit configured to drive the light emitting device, and wherein the load driving circuit is configured to convert an input voltage into a driving signal, and to supply the driving signal thus converted to a load, and the load driving circuit comprises:

a main transformer arranged such that the load is connected to a secondary winding side thereof;

a first error amplifier configured to generate a feedback signal that corresponds to the difference between a detection signal which indicates an electrical state of the load and a predetermined first reference voltage;

a current generating transistor;

a current generating resistor arranged between the current generating transistor and a fixed voltage terminal;

a second error amplifier arranged such that a first input terminal thereof receives, as an input signal, an electric potential at a connection node that connects the current generating transistor and the current generating resistor, a predetermined second reference voltage is input to a second input terminal thereof, and an output terminal thereof is connected to a control terminal of the current generating transistor;

an adjustment resistor arranged between an output terminal of the first error amplifier and a connection node that connects the current generating transistor and the current generating resistor;

an oscillator configured to alternately repeat a state in which a capacitor is charged using a charging current that corresponds to a frequency control current that flows through the current generating transistor and a state in which the capacitor is discharged, so as to output a pulse frequency modulation signal having an edge synchronized to the charge/discharge transition; and a main transformer driving unit configured to drive a primary winding of the main transformer according to the pulse frequency modulation signal.

13. A load driving circuit configured to convert an input voltage into a driving signal, and to supply the driving signal thus converted to a load, the load driving circuit comprising:

a main transformer arranged such that the load is connected to a secondary winding side thereof;

a first error amplifier configured to generate a feedback signal that corresponds to the difference between a detection signal which indicates an electrical state of the load and a predetermined first reference voltage;

an oscillator configured to generate a pulse frequency modulation signal having a frequency that corresponds to the feedback signal;

a burst current source configured to receive a pulse modulated burst dimming control signal which is an instruction to switch the period between an off period and an on period, and to perform an operation in which, when the burst dimming control signal is an instruction to set the period to the off period, a current is supplied to a terminal configured to receive the detection signal so as to change the level of the feedback signal such that the frequency of the oscillator is raised;

a comparator configured to compare the feedback signal with a predetermined threshold voltage, and to generate a burst signal that corresponds to the comparison result; and a main transformer driving unit configured to drive the primary winding of the main transformer according to the pulse frequency modulation signal when the burst signal is a first level, and to stop the driving of the primary winding of the main transformer when the burst signal is a second level.

14. A load driving circuit according to claim 13, wherein, when the period transits from the off period to the on period, the main transformer driving unit is configured to raise, over time, the duty ratio of a driving pulse to be supplied to the primary winding of the main transformer.

15. A load driving circuit according to claim 13, wherein, when the period transits from the on period to the off period, the main transformer driving unit is configured to reduce, over time, the duty ratio of a driving pulse to be supplied to the primary winding of the main transformer.

16. A load driving circuit according to claim 14, wherein the oscillator is configured to output a cyclic signal having a ramp waveform that is synchronized to the pulse frequency modulation signal, in addition to the pulse frequency modulation signal, and wherein the load driving circuit further comprises:

a slope voltage generating unit configured to generate a slope voltage having a voltage level that changes over time when level transition occurs in the burst signal; and a pulse width modulation comparator configured to compare the slope voltage with the cyclic signal so as to generate a pulse width modulation signal having a duty ratio that changes over time, and wherein the main transformer driving unit is configured to change the duty ratio of the driving pulse according to the pulse width modulation signal.

17. A load driving circuit according to claim 16, wherein the slope voltage generating unit comprises:

a capacitor arranged such that one terminal thereof is set to a fixed electric potential; and a charge/discharge circuit configured to alternately switch, when level transition occurs in the burst signal, between a state in which the capacitor is charged and a state in which the capacitor is discharged, wherein a voltage that develops at the capacitor is output as the slope voltage.

18. A load driving circuit configured to convert an input voltage into a driving signal, and to supply the driving signal thus converted to a load, the load driving circuit comprising:

a main transformer arranged such that the load is connected to a secondary winding side thereof;

a first error amplifier configured to generate a feedback signal that corresponds to the difference between a detection signal which indicates an electrical state of the load and a predetermined first reference voltage;

an oscillator configured to generate a pulse frequency modulation signal having a frequency that corresponds to the feedback signal;

a burst current source configured to receive a pulse modulated burst dimming control signal which is an instruction to switch the period between an off period and an on period, and to perform an operation in which, when the burst dimming control signal is an instruction to set the period to the off period, a current is supplied to a terminal configured to receive the detection signal so as to change the level of the feedback signal such that the frequency of the oscillator is raised; and a main transformer driving unit configured to drive a primary winding of the main transformer according to the pulse frequency modulation signal, wherein, when the period transits from the off period to the on period, the main transformer driving unit raises, over time, the duty ratio of the driving pulse to be supplied to the primary winding of the main transformer, and wherein, when the period transits from the on period to the off period, the main transformer driving unit reduces the duty ratio of the driving pulse.

19. A load driving circuit according to claim 18, wherein the oscillator is configured to output a cyclic signal having a ramp waveform that is synchronized to the pulse frequency modulation signal, in addition to the pulse frequency modulation signal, and wherein the load driving circuit further comprises:

a slope voltage generating unit configured to generate a slope voltage having a voltage level that changes over time when level transition occurs in the burst dimming control signal; and a pulse width modulation comparator configured to compare the slope voltage with the cyclic signal so as to generate a pulse width modulation signal having a duty ratio that changes over time, and wherein the main transformer driving unit is configured to change the duty ratio of the driving pulse according to the pulse width modulation signal.

20. A load driving circuit according to claim 19, wherein the slope voltage generating unit comprises:

a capacitor arranged such that one terminal thereof is set to a fixed electric potential; and a charge/discharge circuit configured to alternately switch, when level transition occurs in the burst dimming control signal, between a state in which the capacitor is charged and a state in which the capacitor is discharged, wherein a voltage that develops at the capacitor is output as the slope voltage.

21. A load driving circuit according to claim 13, wherein the load is configured as a fluorescent lamp, and wherein the load driving circuit is configured to drive the load according to a driving signal that develops at the secondary winding of the main transformer.

22. A load driving circuit according to claim 13, wherein the load is configured as a light emitting diode, and wherein the secondary winding of the main transformer comprises a first coil and a second coil arranged such that one terminal of each coil is grounded, and such that they have opposite polarities, and wherein the load driving circuit comprises:

an output capacitor arranged such that one terminal thereof is grounded;

a first diode arranged between the other terminal of the first coil and the other terminal of the output capacitor; and a second diode arranged between the other terminal of the second coil and the other terminal of the output capacitor, and wherein the light emitting diode is driven according to the driving signal smoothed by the output capacitor.

23. A light emitting apparatus comprising:

a light emitting device; and a load driving circuit configured to drive the light emitting device, wherein the load driving circuit is configured to convert an input voltage into a driving signal, and to supply the driving signal thus converted to a load, the load driving circuit comprises:

a main transformer arranged such that the load is connected to a secondary winding side thereof;

a first error amplifier configured to generate a feedback signal that corresponds to the difference between a detection signal which indicates an electrical state of the load and a predetermined first reference voltage;

an oscillator configured to generate a pulse frequency modulation signal having a frequency that corresponds to the feedback signal;

a burst current source configured to receive a pulse modulated burst dimming control signal which is an instruction to switch the period between an off period and an on period, and to perform an operation in which when the burst dimming control signal is an instruction to set the period to the off period, a current is supplied to a terminal configured to receive the detection signal so as to change the level of the feedback signal such that the frequency of the oscillator is raised;

a comparator configured to compare the feedback signal with a predetermined threshold voltage, and to generate a burst signal that corresponds to the comparison result; and a main transformer driving unit configured to drive the primary winding of the main transformer according to the pulse frequency modulation signal when the burst signal is a first level, and to stop the driving of the primary winding of the main transformer when the burst signal is a second level.

24. A light emitting apparatus according to claim 23, wherein the light emitting device is configured as a fluorescent lamp.

25. A light emitting apparatus according to claim 23, wherein the light emitting device is configured as a light emitting diode.

26. A display apparatus comprising:

a liquid crystal panel; and a light emitting apparatus configured as a backlight arranged on the back face of the liquid crystal panel, wherein the light emitting apparatus comprises:

a light emitting device; and a load driving circuit configured to drive the light emitting device, wherein the load driving circuit is configured to convert an input voltage into a driving signal, and to supply the driving signal thus converted to a load, the load driving circuit comprises:

a main transformer arranged such that the load is connected to a secondary winding side thereof;

a first error amplifier configured to generate a feedback signal that corresponds to the difference between a detection signal which indicates an electrical state of the load and a predetermined first reference voltage;

an oscillator configured to generate a pulse frequency modulation signal having a frequency that corresponds to the feedback signal;

a burst current source configured to receive a pulse modulated burst dimming control signal which is an instruction to switch the period between an off period and an on period, and to perform an operation in which, when the burst dimming control signal is an instruction to set the period to the off period, a current is supplied to a terminal configured to receive the detection signal so as to change the level of the feedback signal such that the frequency of the oscillator is raised;

a comparator configured to compare the feedback signal with a predetermined threshold voltage, and to generate a burst signal that corresponds to the comparison result; and a main transformer driving unit configured to drive the primary winding of the main transformer according to the pulse frequency modulation signal when the burst signal is a first level, and to stop the driving of the primary winding of the main transformer when the burst signal is a second level.

* * * * *